(12) United States Patent
Ensor

(10) Patent No.: US 6,502,092 B1
(45) Date of Patent: Dec. 31, 2002

(54) REFERENTIAL INTEGRITY NAVIGATION IN A DATABASE SYSTEM

(75) Inventor: David A. Ensor, Loughton (GB)

(73) Assignee: BMC Software, Inc., Houston, TX (US)

(*) Notice: Subject to any disclaimer, the term of this patent is extended or adjusted under 35 U.S.C. 154(b) by 292 days.

(21) Appl. No.: 09/629,656

(22) Filed: Aug. 1, 2000

(51) Int. Cl.[7] .............................................. G06F 17/30
(52) U.S. Cl. ............................................ 707/3; 707/10
(58) Field of Search ............................. 707/1, 2, 3, 4, 707/10, 101, 102, 103, 201

(56) References Cited

U.S. PATENT DOCUMENTS

| | | | | |
|---|---|---|---|---|
| 5,499,359 A | * | 3/1996 | Vijaykumar | 707/201 |
| 5,553,218 A | * | 9/1996 | Li et al. | 707/102 |
| 5,832,498 A | * | 11/1998 | Exertier | 707/1 |
| 6,070,165 A | | 5/2000 | Whitmore | 707/101 |
| 6,154,750 A | | 11/2000 | Roberge et al. | 707/104.1 |
| 6,401,089 B2 | * | 6/2002 | Isip, Jr. | 707/2 |

OTHER PUBLICATIONS

Mukhopadhyay et al. "Practical Approaches to Maintaining Referential in Multidatabase Sytems" Apr. 1993 Proceedings RIDE–IMS Third international Workshop, IEEE, pp 42–49.*

* cited by examiner

Primary Examiner—Jack Choules
(74) Attorney, Agent, or Firm—Wong, Cabello, Lutsch, Rutherford & Brucculeri, P.C.

(57) ABSTRACT

The invention is an improved system and method for browsing and editing data residing in database tables. The method of the present invention includes the steps of providing a graphical user interface in communication with a database, receiving user input to the graphical user interface, retrieving data from the database, displaying the retrieved data in the graphical user interface, and navigating to one or more referenced database tables or views by user request entered on the graphical user interface. The purpose of referential integrity is to prevent database users or applications from entering inconsistent data into a database. The goal of referential integrity navigation is to allow the user, having retrieved one or more rows of data, to navigate easily to the data in other tables that either refers to or is referred to by that data. These relationships are defined by referential integrity constraints, and the data thus retrieved by navigation is then available for all the operations possible on the original data, including data editing and further relational navigation. By storing a catalog of the relationships known to exist between Oracle's V$ views, the same form of navigation can be provided between these data sources.

39 Claims, 20 Drawing Sheets

REFERENTIAL INTEGRITY NAVIGATION IN A DATABASE SYSTEM

BACKGROUND OF THE INVENTION

1. Field of the Invention

The present invention generally relates to systems and methods for navigating relationships between two or more tables or views in a database. More particularly, the present invention relates to systems and methods for graphically representing the navigation of the relationships between two or more tables or views in a database.

2. Description of the Related Art

A database administrator (DBA) has many tasks to perform to maintain a smoothly running database for his/her users. Response time (i.e., performance) of a database is one of the most noticeable elements of the database to a database user. Managing the performance of a database requires a DBA to monitor various aspects of the use of the database.

One example of a relational database in widespread use today is the Oracle DBMS (database management system), which is a product sold by Oracle Corporation. Among the data sources available to an Oracle DBA for monitoring the performance of an Oracle database are a set of "fixed tables", the data in which is documented and externalized by Oracle Corporation in views known as V$ views. The data in the fixed tables are maintained by an Oracle server and are accessible to users of that database through the V$ views, subject to authentication. The V$ views are so named because each has the prefix V$ as part of its name. The underlying tables are kept continuously up to date while the Oracle database is open and in use, and the contents of these tables relate primarily to performance. Although these tables appear to be regular database tables, they are actually read-only tables. That is, the only action permitted against them is query. Other actions that are normally possible against database tables (e.g., insert, update, and delete) are prohibited.

There are two sets of V$ views. The first set is built directly into the Oracle database engine and is visible only to the special users SYS and INTERNAL. During the standard database creation process Oracle creates a second set of views against the internal or fixed V$ views. This second set of views uses the name prefix V_$, and the creation process grants query rights to these views. Oracle also creates a series of public synonyms for the V_$ views, each with the same name as the original V$ view. By convention, DBAs and other database users access the V$ views through their identically named synonyms rather than through the V_$ objects. Once the instance of the database is started, the V$ views are accessible. The database does not have to be mounted or open, that is data can be retrieved from the V$ views at a time when no normal database objects can be accessed. One important consequence of this fact is that the V$LOG view can be used to identify log files needed for recovery.

A series of views referred to as GV$ views are similar to the V$ views. The GV$ views contain the same information as the V$ views, plus an additional column for the instance ID (inst_id). The GV$ views are used primarily in Oracle Parallel Server environments. A DBA may query the V$ views for the current instance information or query the GV$ views to receive V$ information from all instances, not just the current instance.

Oracle also has a feature that allows the specification of Referential Integrity Constraints. Referential Integrity Constraints allow the person creating a database table to state that certain values may only be present in one table if they are also present in some other table, thereby constraining the set of permitted values. For example each row of a table called TRANSACTIONS might be constrained to ensure that the ACCOUNT_NUMBER within the transaction also existed with a table called ACCOUNTS. The purpose of referential integrity is to prevent database users or applications from entering inconsistent data into a database.

The existence of a Referential Integrity Constraint identifies a parent—child relationship between two database tables. Thus such a constraint may be used to indicate that the database has the capability to store many transactions for a single account, and also to indicate that every transaction within the database will reference an account that is defined within the database. In turn, the existence of such a constraint allows a user or program interrogating the database to assert a formal relationship between two tables that would otherwise be either conjecture or simply not apparent.

Currently, Oracle does not implement referential integrity constraints on either views or on the fixed tables that underlie the V$ views. Due to this lack of relating the various V$ views (and, similarly, the GV$ views) to each other, the DBA's task of monitoring the performance of the database is made more difficult.

Both DBAs and database users desire the ability to quickly browse and edit data residing in database tables. Typically DBAs are interested in the tables that refer to database administration and performance, whereas the database users are interested in the tables that contain their application data. Examples of instances in which speed of editing would be useful include: populating test tables with data, and making a change in a production environment to solve a problem.

Current methods of browsing and editing data residing in database tables require either scripts to be run or commands to be entered by the user. Typically, one set of scripts or commands may be used to retrieve (i.e., browse) the data, followed by analysis of the retrieved data by the user, and lastly another set of scripts or commands may be issued by the user to edit the data, based on their analysis. This series of steps may be time-consuming and error-prone.

Accordingly, what is needed is a reliable way for either a DBA or a database user to quickly browse and edit data residing in database tables. In addition, it would be helpful to both DBAs and database users if relationships were established between the various V$ views and GV$ views, to ease understanding of the state of the database.

SUMMARY OF THE INVENTION

The above limitations of previously known methods of browsing and editing data residing in database tables are overcome by a system and method made in accordance with the principles of the present invention. One embodiment of the method of the present invention includes the steps of providing a graphical user interface in communication with a database, receiving user input to the graphical user interface, retrieving data from the database, displaying the retrieved data in the graphical user interface, and navigating to one or more referenced database tables or views by user request entered on the graphical user interface.

The relationships or references that a database table has to other database tables in the same database is subject to constant change as the records in the database are modified (i.e., inserted, updated, deleted). Referential Integrity is the process of automatically maintaining the correctness or consistency of data in a relational database when modifications are made to fields in a first table, wherein the modified fields are related to other fields in one or more other tables within the same relational database. The purpose of referential integrity is to prevent database users or applications from entering inconsistent data into a database. The goal of referential integrity navigation is to allow the user, having retrieved one or more rows of data, to navigate easily to the data in other tables that either refers to or is referred to by that data. These relationships are defined by referential integrity constraints, and the data thus retrieved by navigation is then available for all the operations possible on the original data, including data editing and further relational navigation. By storing a catalog of the relationships known to exist between Oracle's V$ views, the same form of navigation can be provided between these data sources.

By automatically displaying to the user via the graphical user interface a listing of the one or more database tables that are referred to by a specific database table, along with the one or more database tables that refer to a specific database table, the referential integrity of the specific database table may be navigated. This navigation allows the user to more rapidly and accurately browse and/or edit the tables of a database. As noted previously, the same concepts of navigation of relationships described for database tables also applies to database views.

Particularly in the Oracle database, the system-created views on the dynamic performance tables referred to as V$ views and GV$ views do not have referential integrity specified within the database. Due to this lack of relating the various V$ views and GV$ views to each other, the DBA's task of monitoring the performance of the database is made more difficult. One feature of the present invention provides "referential declaration" for the purpose of traversing the Oracle V$ views and GV$ views in the same manner as regular database tables may be traversed.

These and other benefits and advantages of the present invention shall become apparent from the detailed description of the invention presented below in conjunction with the figures accompanying the description.

BRIEF DESCRIPTION OF THE DRAWINGS

A better understanding of the present invention may be obtained when the following detailed description of the preferred embodiment is considered in conjunction with the following drawings, in which.

Figure 1:
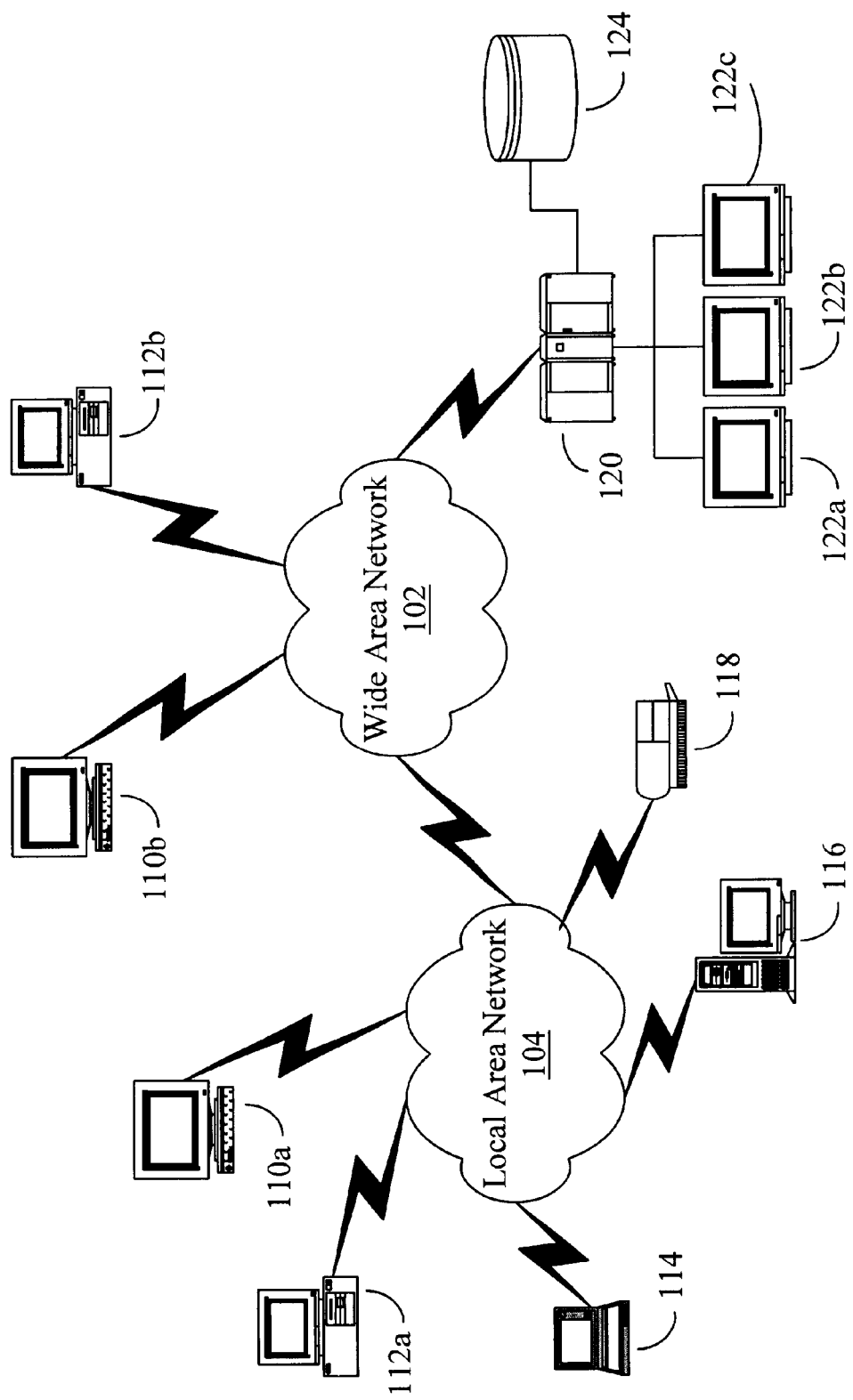
FIG. 1 is a network diagram of a wide area network that is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

The following material is hereby incorporated by reference as though fully and completely set forth herein: U.S. application Ser. No. 09/566,260 titled "Trial Server" and filed May 5, 2000, whose inventor is David Moore, and (Atty Docket 5253-03100).

FIG. 1: Wide Area Network

FIG. 1 illustrates a wide area network (WAN) according to one embodiment. A WAN 102 is a network that spans a relatively large geographical area. The Internet is an example of a WAN 102. A WAN 102 typically includes a plurality of computer systems which are interconnected through one or more networks. Although one particular configuration is shown in FIG. 1, the WAN 102 may include a variety of heterogeneous computer systems and networks which are interconnected in a variety of ways and which run a variety of software applications.

One or more local area networks (LANs) 104 may be coupled to the WAN 102. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, and 116, and one printer 118. The LAN 104 may be coupled to other computer systems and/or other devices and/or other LANs 104 through the WAN 102.

One or more mainframe computer systems 120 may be coupled to the WAN 102. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

The WAN 102 may also include computer systems which are connected to the WAN 102 individually and not through a LAN 104: as illustrated, for purposes of example, a workstation 110b and a personal computer 112b. For example, the WAN 102 may include computer systems which are geographically remote and connected to each other through the Internet.

Figure 2:
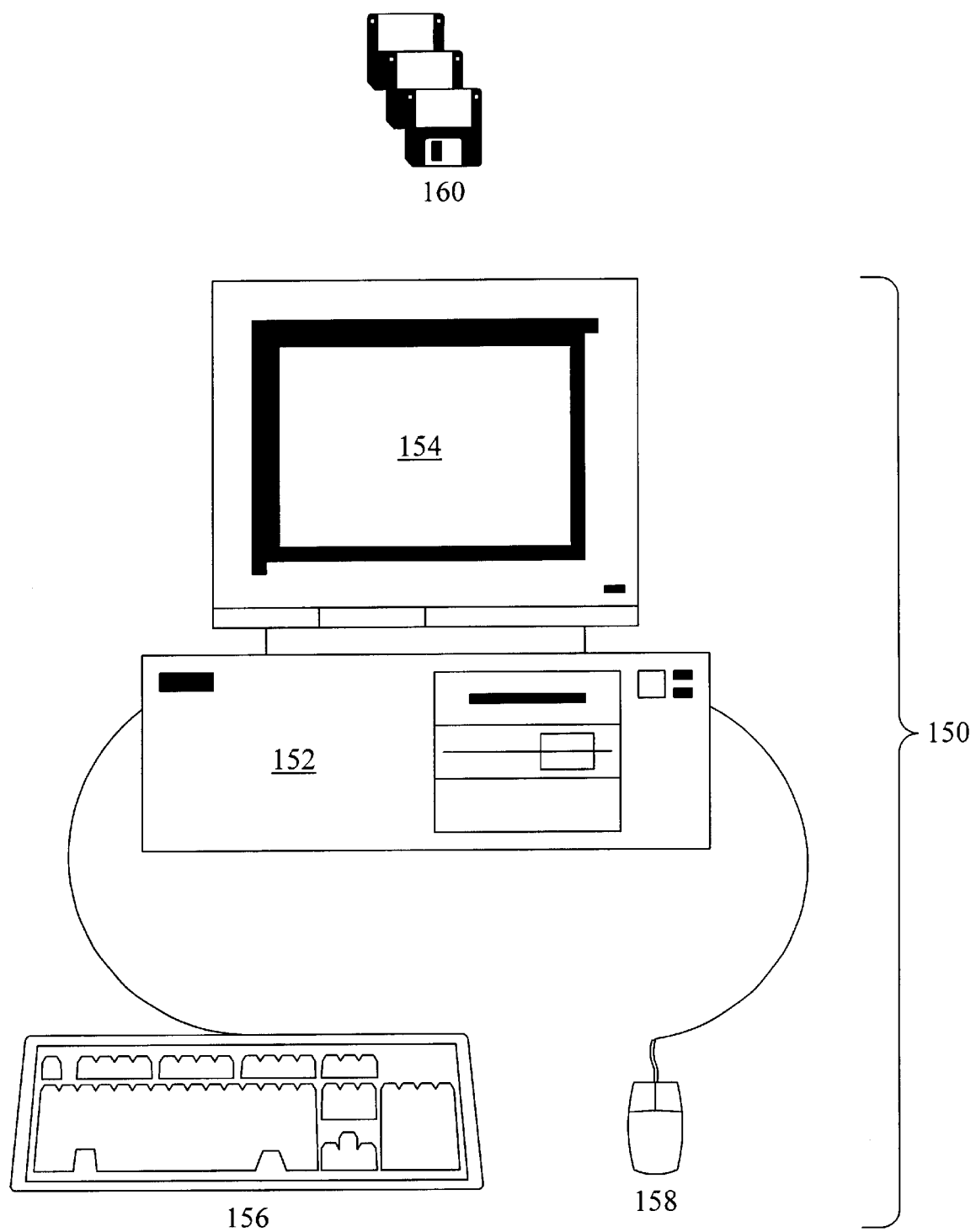
FIG. 2 is an illustration of a typical computer system that is suitable for implementing various embodiments.

FIG. 2: Typical Computer System

FIG. 2 illustrates a typical computer system 150 that is suitable for implementing various embodiments of a system and method for browsing and editing data residing in database tables. Each computer system 150 typically includes components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. The computer system 150 may be operable to execute the computer programs to implement browsing and editing data residing in database tables as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 150 may take various forms, including a personal computer system, mainframe computer system, workstation, network appliance, Internet appliance, personal digital assistant (PDA), television system or other device. In general, the term "computer system" may be broadly defined to encompass any device having a processor which executes instructions from a memory medium.

The memory medium preferably stores a software program or programs for browsing and editing data residing in database tables as described herein. The software program (s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

FIGS. 3–18

FIGS. 3–18 comprise screen shots of one embodiment of a graphical user interface in communication with a database. Information regarding the graphical user interface may be generated by a software program residing on the server system 116 and provided to the client computer system 112, wherein the graphical user interface is presented on the client computer system 112. In other words, the data to be presented on the graphical user interface and the formatting rules to be used are both provided by the server system 116 and the client computer system 112 uses this information to present the graphical user interface on the display screen.

Thus, FIGS. 3–18 are examples of the manner in which the user can use the graphical user interface, e.g., to browse and edit data residing in database tables, or to browse data residing in database views. In other words, the screen shots of FIGS. 3–18 illustrate various examples of the user viewing and/or modifying database objects and/or data stored on the database server accessible via the Internet or an intranet according to one embodiment of the invention.

Figure 3:
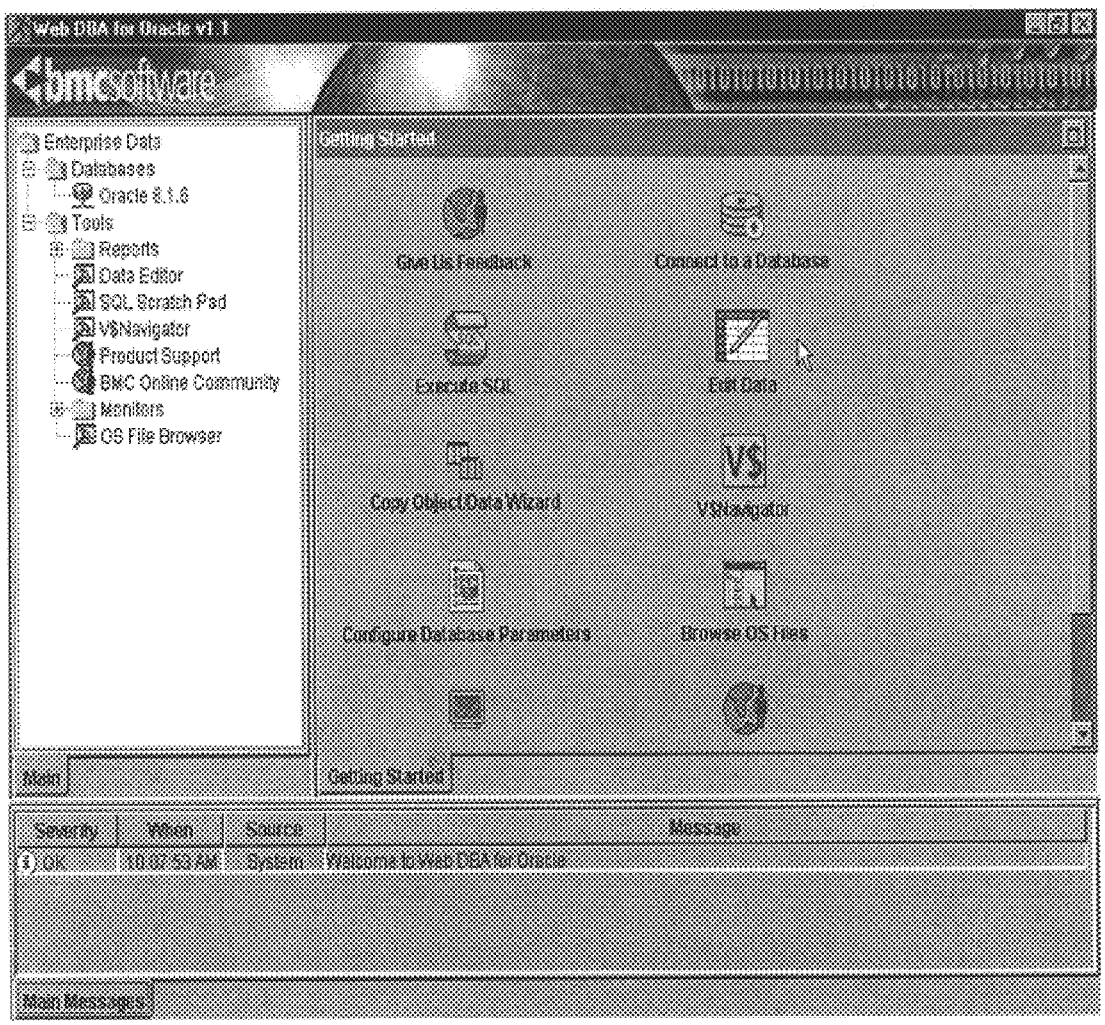
FIG. 3 is a screen shot of a database administration tool that is suitable for implementing various embodiments.

FIG. 3: Database Administration Tool

FIG. 3 illustrates a screen shot of a database administration tool according to one embodiment. After the selection of the "Edit Data" element shown in FIG. 3, the user is presented with a list of database instances available (see FIG. 4). As shown in the "Getting Started" section of the screen shot in FIG. 3, the user has the following options: "Give Us Feedback", "Connect to a Database", "Execute SQL", "Edit Data", "Copy Object/Data Wizard", "V$Navigator", "Configure Database Parameters", and "Browse OS Files". It is noted that the scroll bar on the right-hand side of the "Getting Started" section of the screen shot indicates that more choices are available to the user. These additional choices may be seen by the user scrolling down in the "Getting Started" section.

Figure 4:
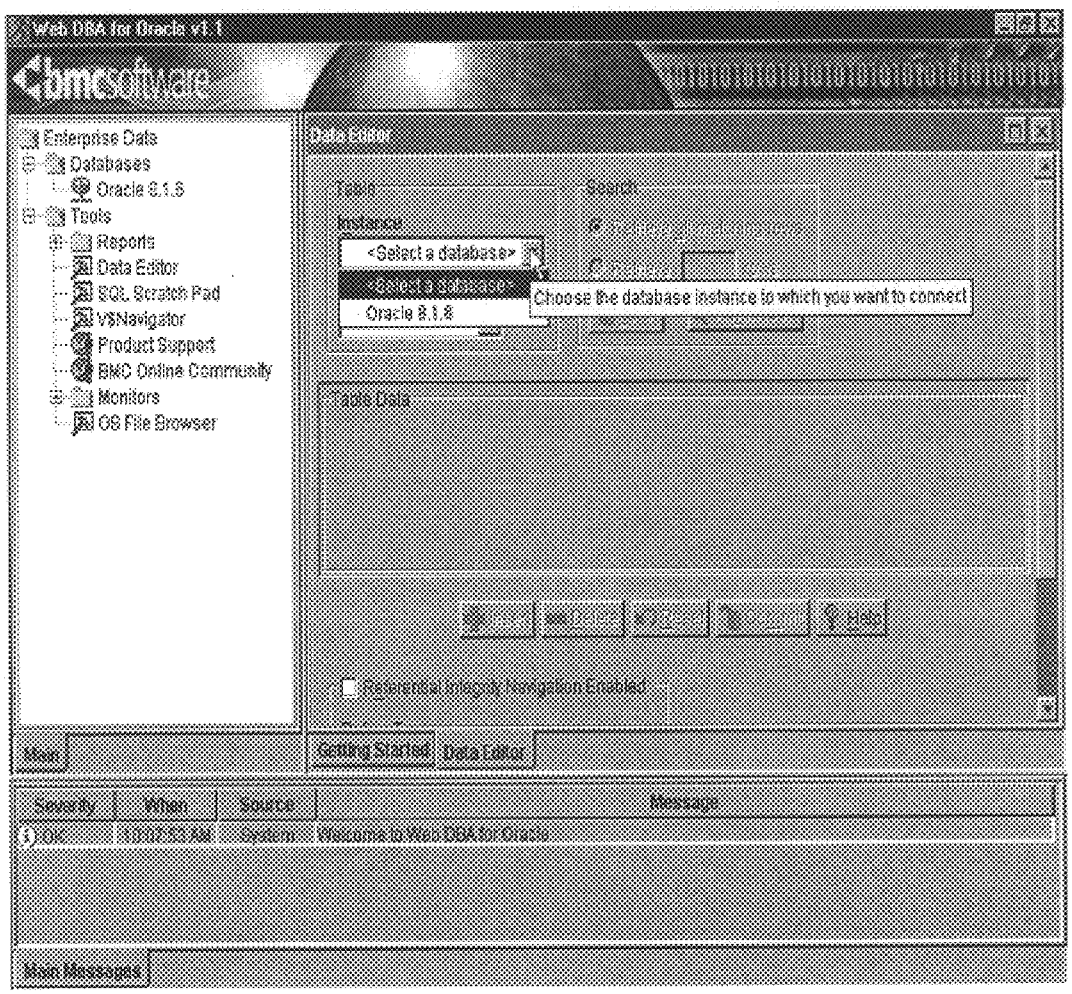
FIG. 4 is a screen shot of a database list that is suitable for implementing various embodiments.

FIG. 4: Database List

FIG. 4 illustrates a screen shot of a database list according to one embodiment. After the selection of the "Edit Data" element shown in FIG. 3, the user is presented with a list of all of the databases that currently are available to the user.

Typically, the user is presented with multiple databases in the database list. As shown in FIG. 4, only one database is available for selection, "Oracle 8.1.6". The name "Oracle 8.1.6" is used in this example as a name of a database. "Oracle 8.1.6" is also known as the unofficial name of a product of Oracle Corporation. Alternate database names may include "FDW_PROD" and "FDW_TEST". The database list is the place where the database name appears for all database currently available to the user.

Figure 5:
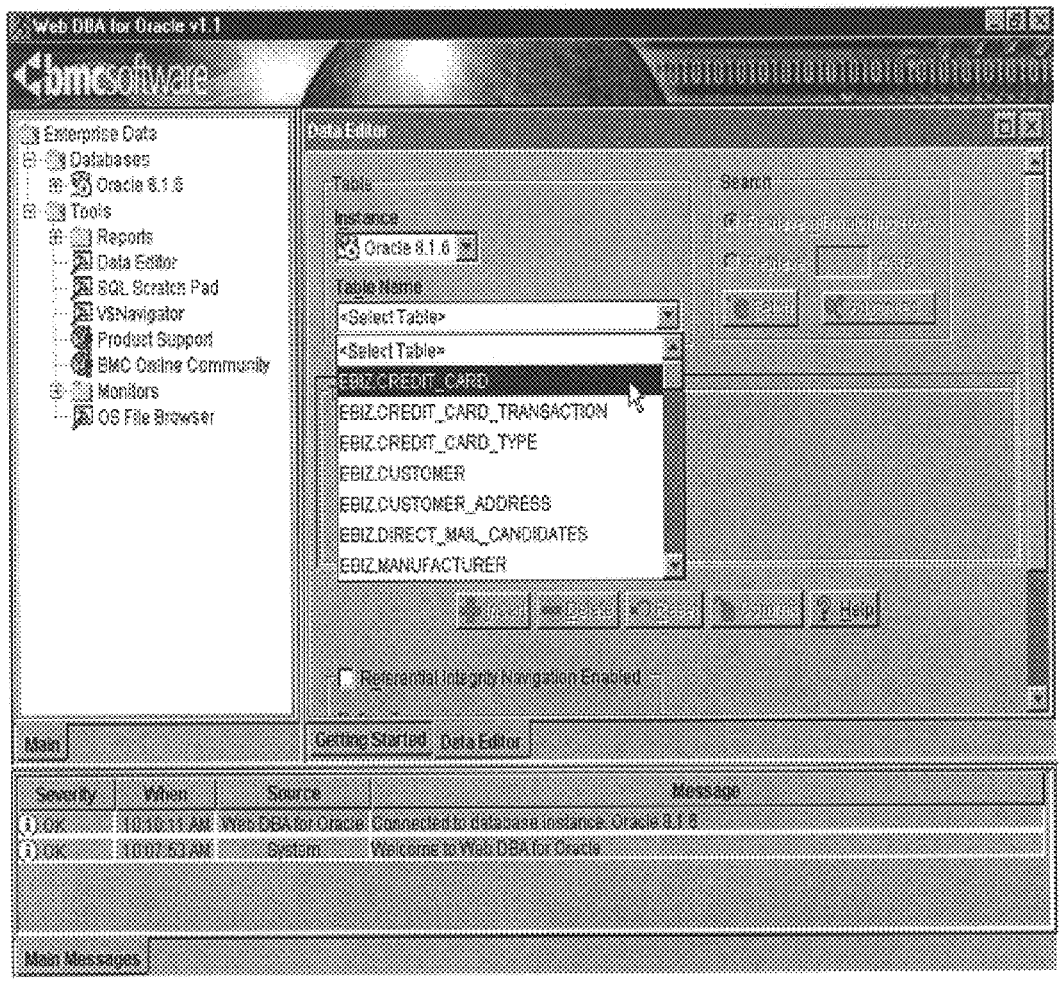
FIG. 5 is a screen shot illustrating the selection of a particular table of a database selected from the list shown in FIG. 4.

FIG. 5: Selection of a Table

FIG. 5 illustrates the selection of a particular table of the "Oracle 8.1.6" database, according to one embodiment. As shown, the user has selected a particular table (i.e., the EBIZ.CREDIT_CARD table). As is common practice for graphical user interfaces, the selected row is highlighted.

Figure 6:
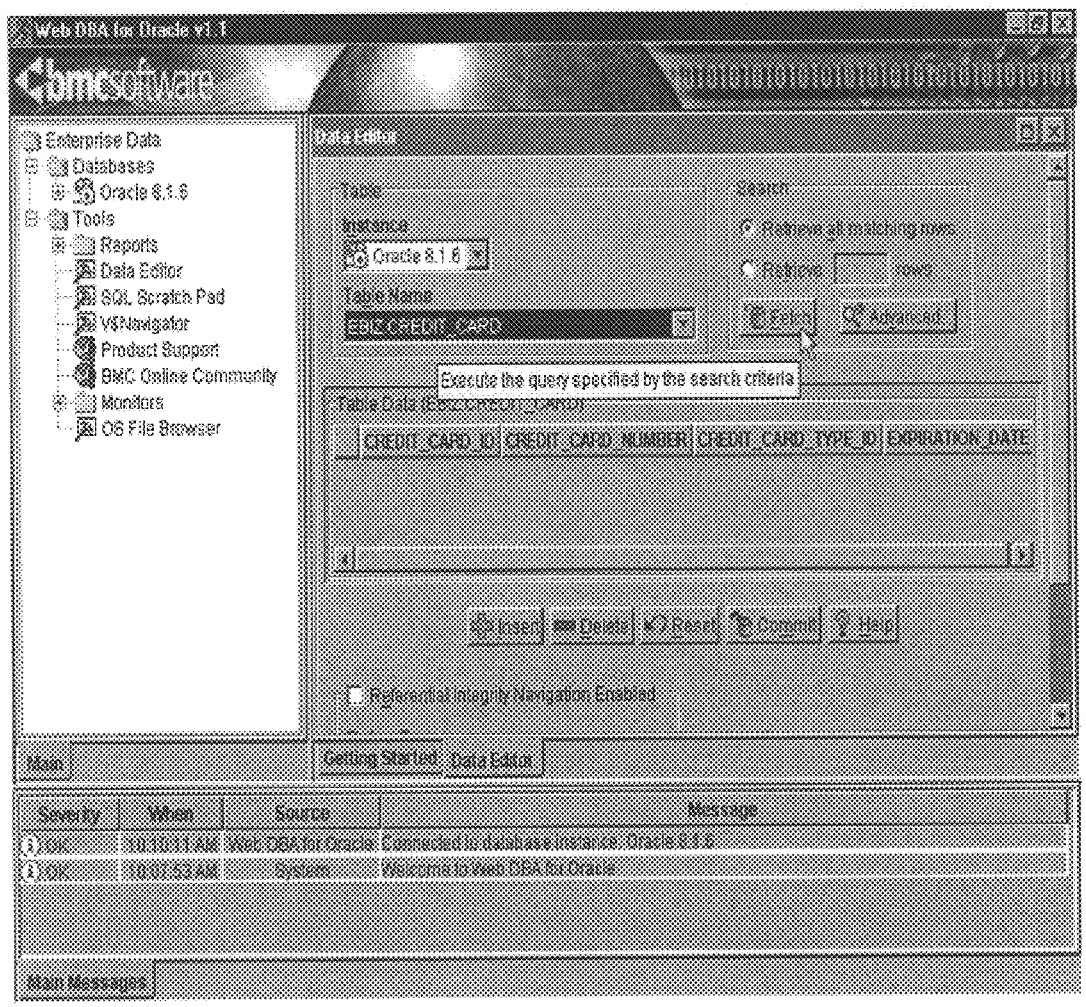
FIG. 6 is a screen shot illustrating the requested retrieval, by the user, of all matching rows of the particular table of a database selected from the list shown in FIG. 4.

FIG. 6: Requested Retrieval of All Matching Rows

FIG. 6 illustrates the requested retrieval of all matching rows of the EBIZ.CREDIT_CARD table, according to one embodiment. As shown, the user has placed the cursor over the "Fetch" push-button which may be found in the Search group box. Other elements of the Search group box include two radio push-buttons with these captions: "Retrieve all matching rows" and "Retrieve_rows". Radio push-buttons usually appear in graphical user interfaces when the choices available to a user are mutually exclusive. In other words, radio push-buttons appear in groups of at least two, and the user must choose only one of the radio push-buttons available. Generally, if a user attempts to choose a second radio push-button, the selection of the first radio push-button is removed, thereby leaving a single choice made by the user. In one embodiment, the "Retrieve_rows" radio push-button is selected as the default choice (i.e., if the user does not specify otherwise, the "Retrieve_rows" choice is chosen for the user). Additionally, it is noted that the "Retrieve_rows" radio push-button can be shown with an entry box where any number is displayed (e.g., 100). This entry box enables the user to change the number of rows to be retrieved. For example, if the entry box displays "100", and the user does not change the number in the entry box, at a maximum 100 rows will be retrieved. If fewer than 100 rows exist in the EBIZ.CREDIT_CARD table, then effectively the "Retrieve all matching rows" and "Retrieve 100 rows" radio push-buttons result in the same output. Similarly, if the entry box for the "Retrieve_rows" radio push-button has no default value specified (i.e., the entry box is blank), then effectively the "Retrieve all matching rows" and "Retrieve_rows" radio push-buttons result in the same output.

Figure 7:
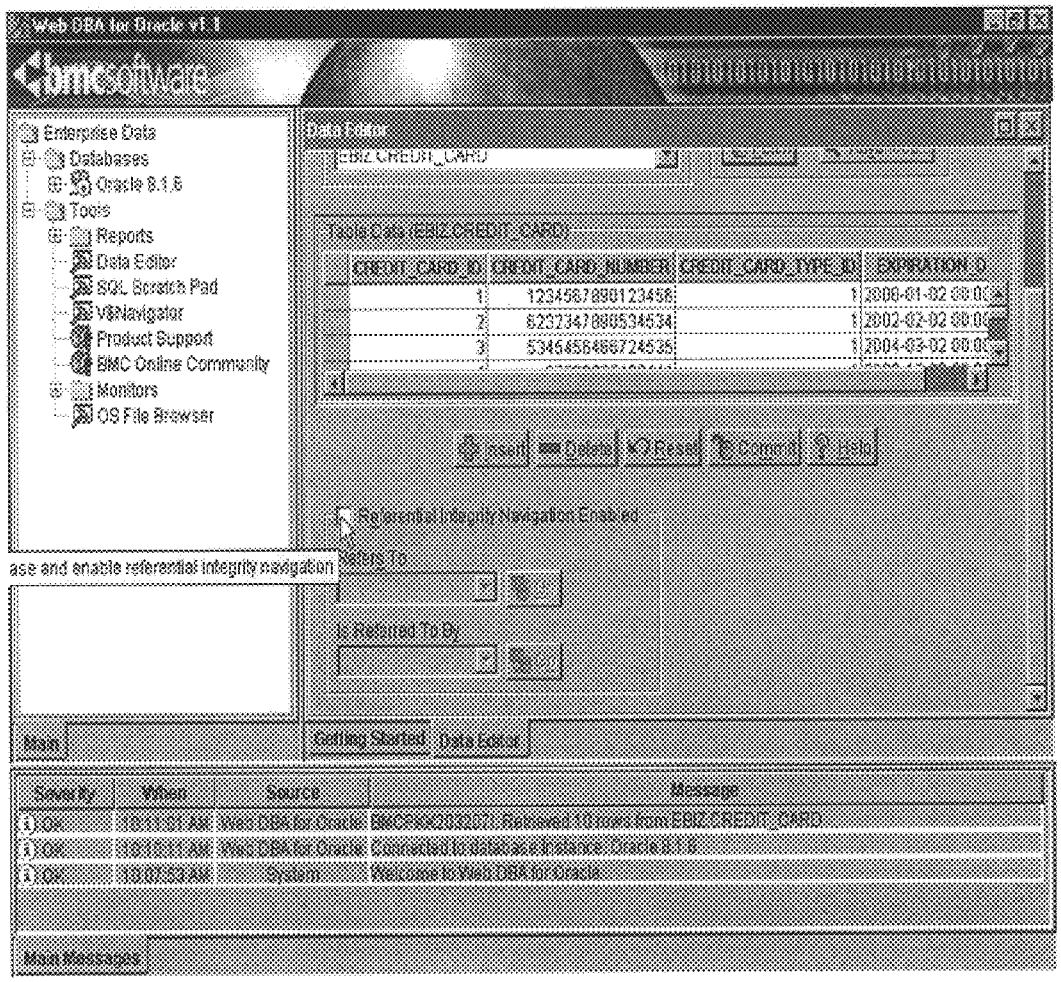
FIG. 7 is a screen shot illustrating the results of the user request submitted, as shown in FIG. 6.

FIG. 7: Results of the Retrieval of all Matching Rows

Figure 8:
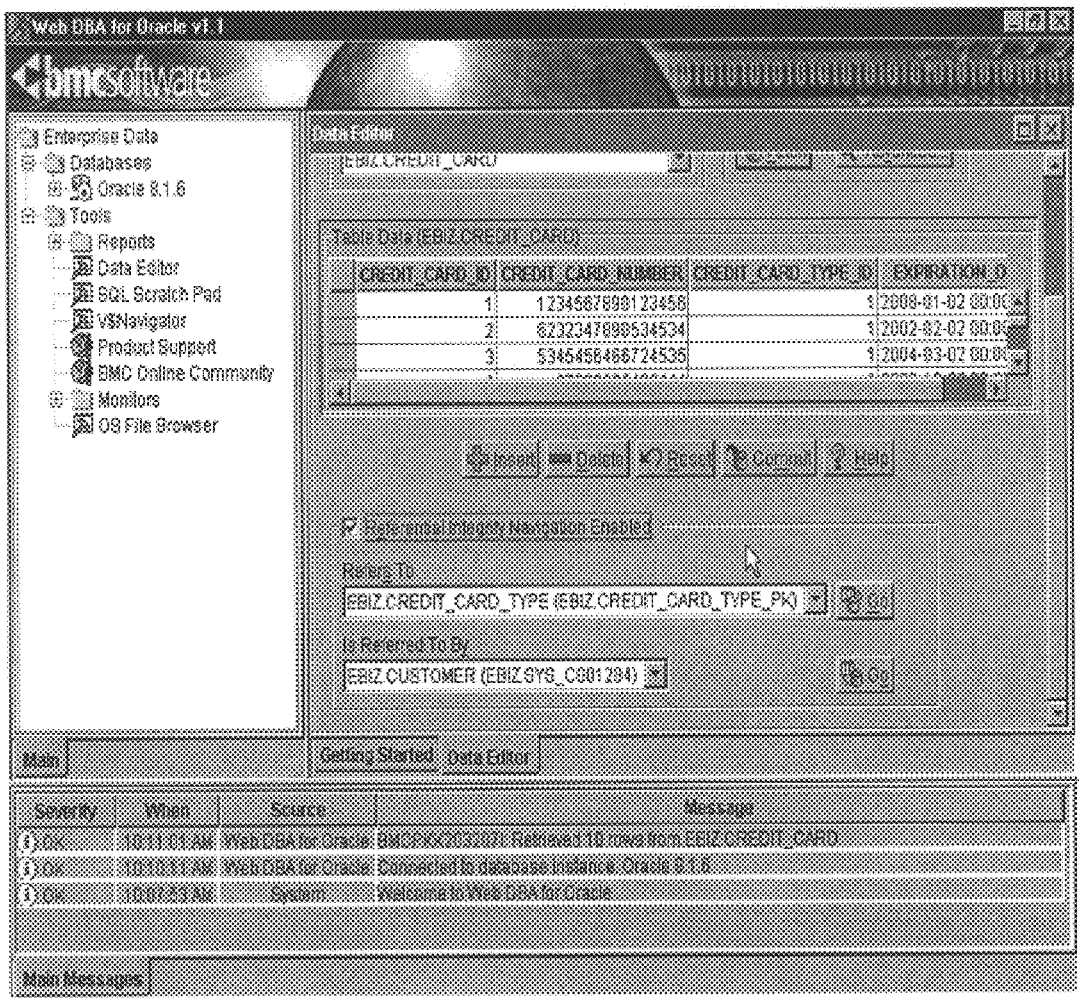
FIG. 8 is a screen shot illustrating the results of the user request to enable referential integrity navigation, as shown in FIG. 7.

FIG. 7 illustrates the results of the user requested retrieval of all matching rows of the EBIZ.CREDIT_CARD table, according to one embodiment. The "Table Data (EBIZ.CREDIT_CARD)" section of the screen shot is shown populated with data retrieved from the database. In contrast, this "Table Data (EBIZ.CREDIT_CARD)" section of the screen shot in FIG. 6 is empty, as the retrieval of the records from the database had not yet begun. As shown in FIG. 7, the user has placed the cursor over the "Referential Integrity Navigation Enabled" checkbox which may be found towards the bottom of the screen shot. The results of the user clicking on the "Referential Integrity Navigation Enabled" checkbox are shown in FIG. 8. The goal of referential integrity navigation is to allow the user, having retrieved one or more rows of data, to navigate easily to the data in other tables that either refers to or is referred to by that data. These relationships are defined by referential integrity constraints, and the data thus retrieved by navigation is then available for all the operations possible on the original data, including data editing and further relational navigation.

FIG. 8: Results of Referential Integrity Navigation Request

FIG. 8 illustrates the results of the user requested referential integrity navigation request, according to one embodiment. The "Refers To" drop-down list is shown populated with database table names retrieved from the database wherein the EBIZ.CREDIT_CARD table refers to these database table names. The EBIZ.CREDIT_CARD table is said to "refer to" a database table in the "Oracle 8.1.6" database if a field in the EBIZ.CREDIT_CARD table is related in some manner to a similarly structured field (although not necessarily identically named field) in the other database table. For example, the CREDIT_CARD_TYPE_ID field of the EBIZ.CREDIT_CARD table is a foreign key on the EBIZ.CREDIT_CARD table and a similarly structured field is represented as a primary key on the EBIZ.CREDIT_CARD_TYPE table (the TYPE field). The similar structure constraint indicates that the fields must be of the same data type (i.e., CHAR, VARCHAR, NUMBER). In a similar fashion, the "Is Referred To By" drop-down list is shown populated with database table names retrieved from the database wherein the EBIZ.CREDIT_CARD table is referred to by these database table names. It is noted that the scroll bar at the bottom of the "Table Data" section of the screen shot indicates that more fields are available to the user. These additional choices may be seen by the user by scrolling to the right.

Figure 9:
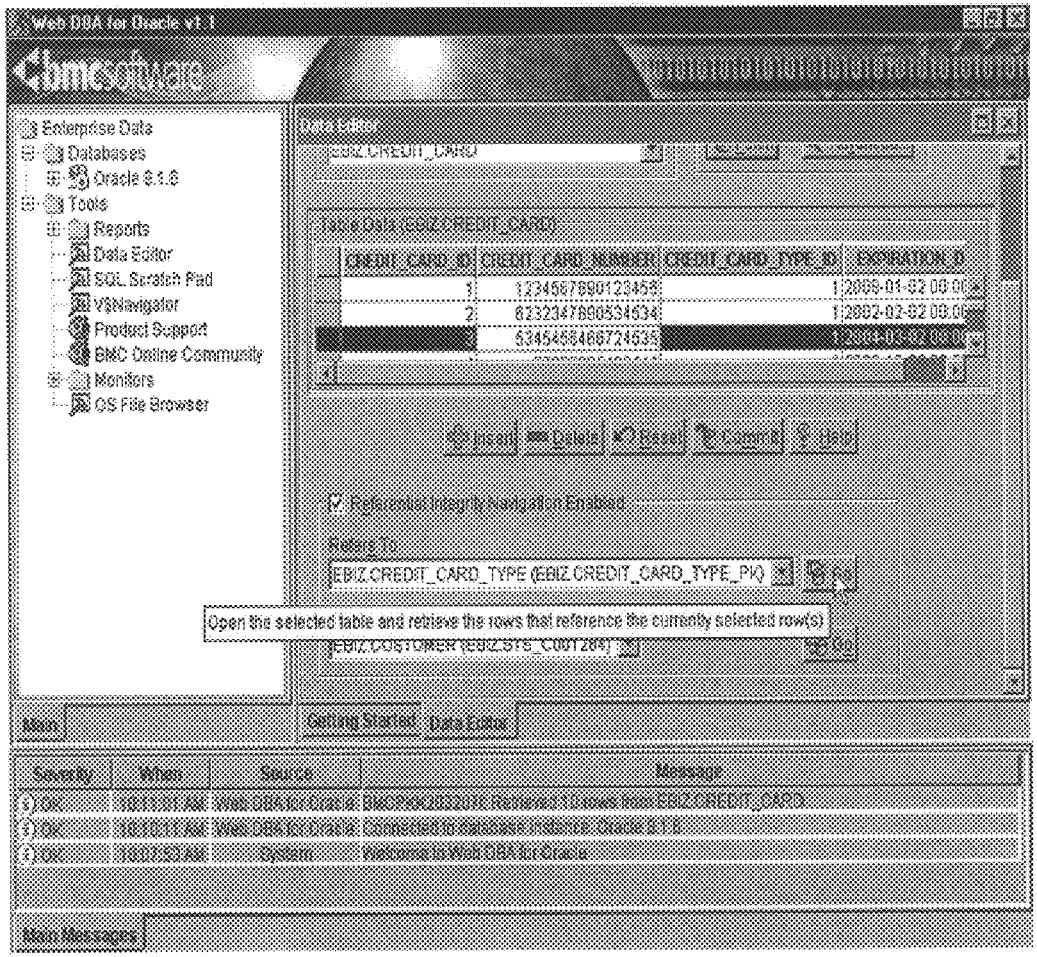
FIG. 9 is a screen shot illustrating the selection of a particular record of the particular table selected in FIG. 5, along with the requested retrieval, by the user, of the rows in another database table which reference the selected record.

FIG. 9: Selection of a Record and Requested Retrieval of Data from Another Table FIG. 9 illustrates the selection of a particular record of the EBIZ.CREDIT_CARD table, according to one embodiment. As shown, the user has selected a particular row (i.e., the row where the CREDIT_CARD_ID field has a value of "3"). Additionally, it is shown that the user has placed the cursor over the "Go" push-button which may be found to the right of the "Refers To" drop-down list. On-line help text which explains the action that will be taken if the "Go" push-button is selected is displayed on the screen shot. It is noted that a similar "Go" push-button may be found to the right of the "Is Referred To By" drop-down list. This "Go" push-button has an action associated with it that is similar to the action associated with the "Go" push-button which may be found to the right of the "Refers To" drop-down list. Review of the on-line help text for the push-button, along with the positioning of each "Go" push-button indicates to the user the action that will be taken upon selection.

Alternatively, the user may navigate to either a "Refers To" table or to a "Is Referred To By" table via a pop-up menu that appears if the user enters a right mouse click on the highlighted record (not shown).

Figure 10:
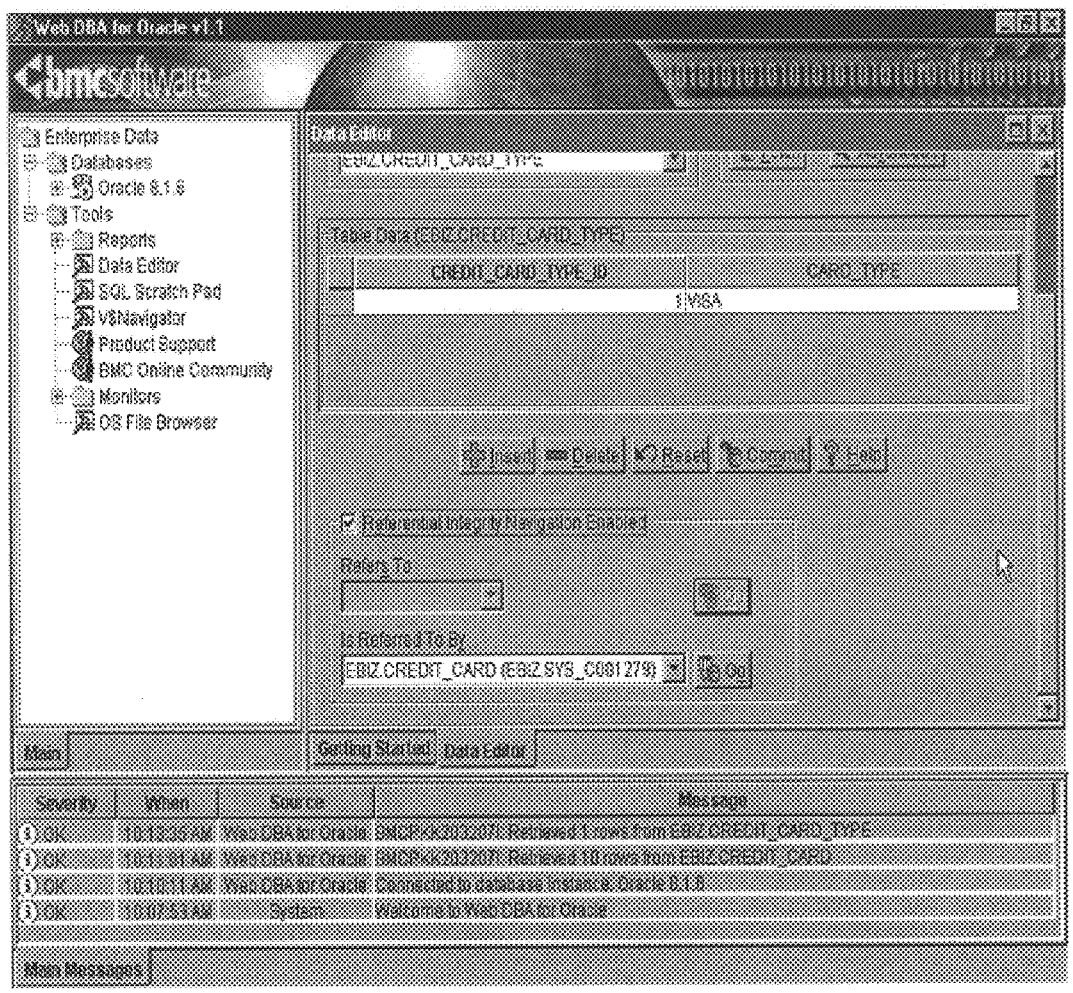
FIG. 10 is a screen shot illustrating the results of the user request submitted, as shown in FIG. 9.

FIG. 10: Results of the Retrieval of Data from Another Table

FIG. 10 illustrates the results of the user clicking on the "Go" push-button which may be found to the right of the "Refers To" drop-down list in FIG. 9. The "Table Data (EBIZ.CREDIT_CARD_TYPE)" section of the screen shot is shown populated with data retrieved from the database. The "Referential Integrity Navigation Enabled" checkbox which may be found towards the bottom of the screen shot is checked. As shown in FIG. 10, there are no tables in the "Refers To" drop-down list, meaning that the EBIZ.CREDIT_CARD_TYPE table refers to no database tables. However, the "Is Referred To By" drop-down list includes the EBIZ.CREDIT_CARD table, indicating that the EBIZ.CREDIT_CARD_TYPE table is referred to by the EBIZ.CREDIT_CARD table.

Figure 11:
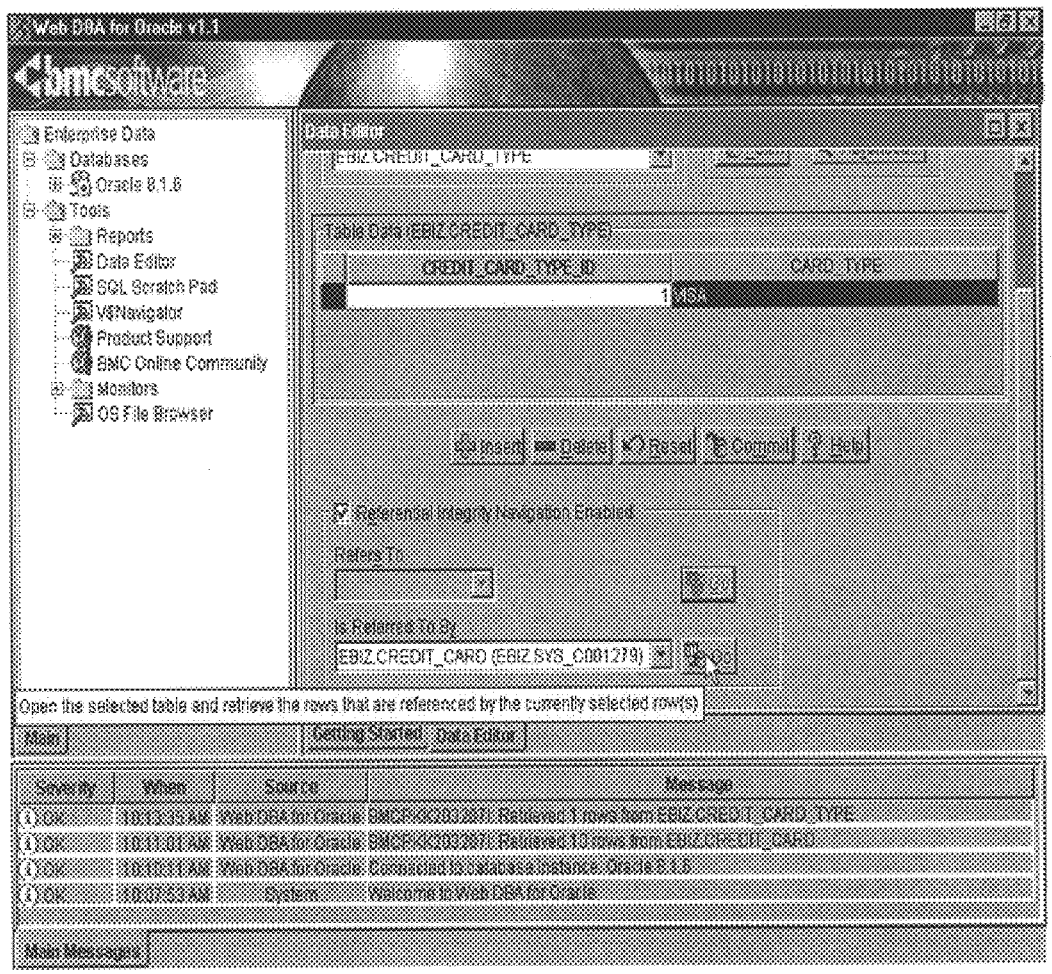
FIG. 11 is a screen shot illustrating the selection of a particular record of the particular table shown in FIG. 10, along with the requested retrieval, by the user, of the rows in another database table which reference the selected record.

FIG. 11: Selection of a Record and Requested Retrieval of Data from Another Table FIG. 11 illustrates the selection of a particular record of the EBIZ.CREDIT_CARD_TYPE table, according to one embodiment. As shown, the user has selected a particular row (i.e., the row where the CARD_TYPE field has a value of "VISA"). Additionally, it is shown that the user has placed the cursor over the "Go" push-button which may be found to the right of the "Is Referred To By" drop-down list. On-line help text which explains the action that will be taken if the "Go" push-button is selected is displayed on the screen shot. It is noted that a similar "Go" push-button may be found to the right of the "Refers To" drop-down list. This "Go" push-button has an action associated with it that is similar to the action associated with the "Go" push-button which may be found to the right of the "Is Referred To By" drop-down list. Review of the on-line help text for the push-button, along with the positioning of each "Go" push-button indicates to the user the action that will be taken upon selection.

Figure 12:
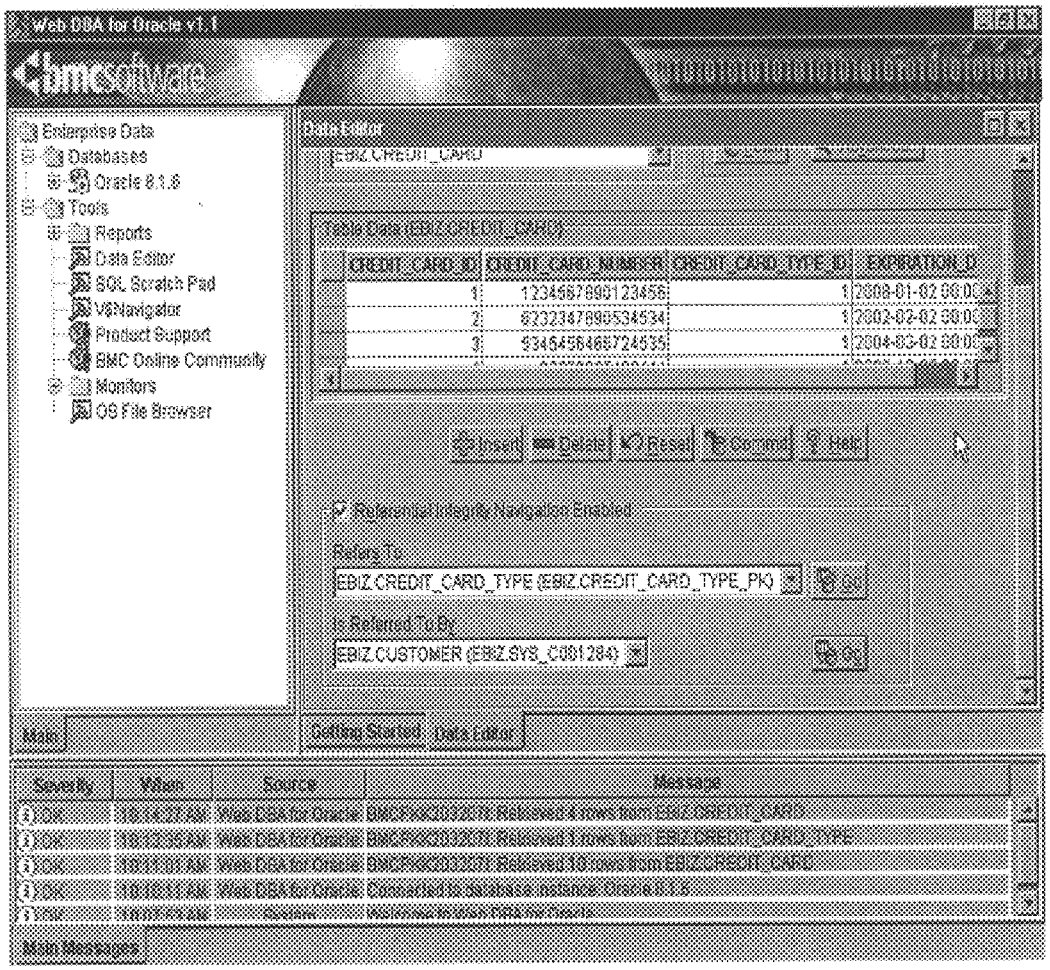
FIG. 12 is a screen shot illustrating the results of the user request submitted, as shown in FIG. 11.

FIG. 12: Results of the Retrieval of Data from Another Table

FIG. 12 illustrates the results of the user clicking on the "Go" push-button which may be found to the right of the "Is Referred To By" drop-down list in FIG. 11. The "Table Data (EBIZ.CREDIT_CARD)" section of the screen shot is shown populated with data retrieved from the database. The "Referential Integrity Navigation Enabled" checkbox which may be found towards the bottom of the screen shot is checked. As shown in FIG. 12, the "Refers To" drop-down list, includes the EBIZ.CREDIT_CARD_TYPE table, indicating that the EBIZ.CREDIT_CARD table refers to the EBIZ.CREDIT_CARD_TYPE table. Similarly, the "Is Referred To By" drop-down list includes the EBIZ.CUSTOMER table, indicating that the EBIZ.CREDIT_CARD table is referred to by the EBIZ.CUSTOMER table.

Figure 13:
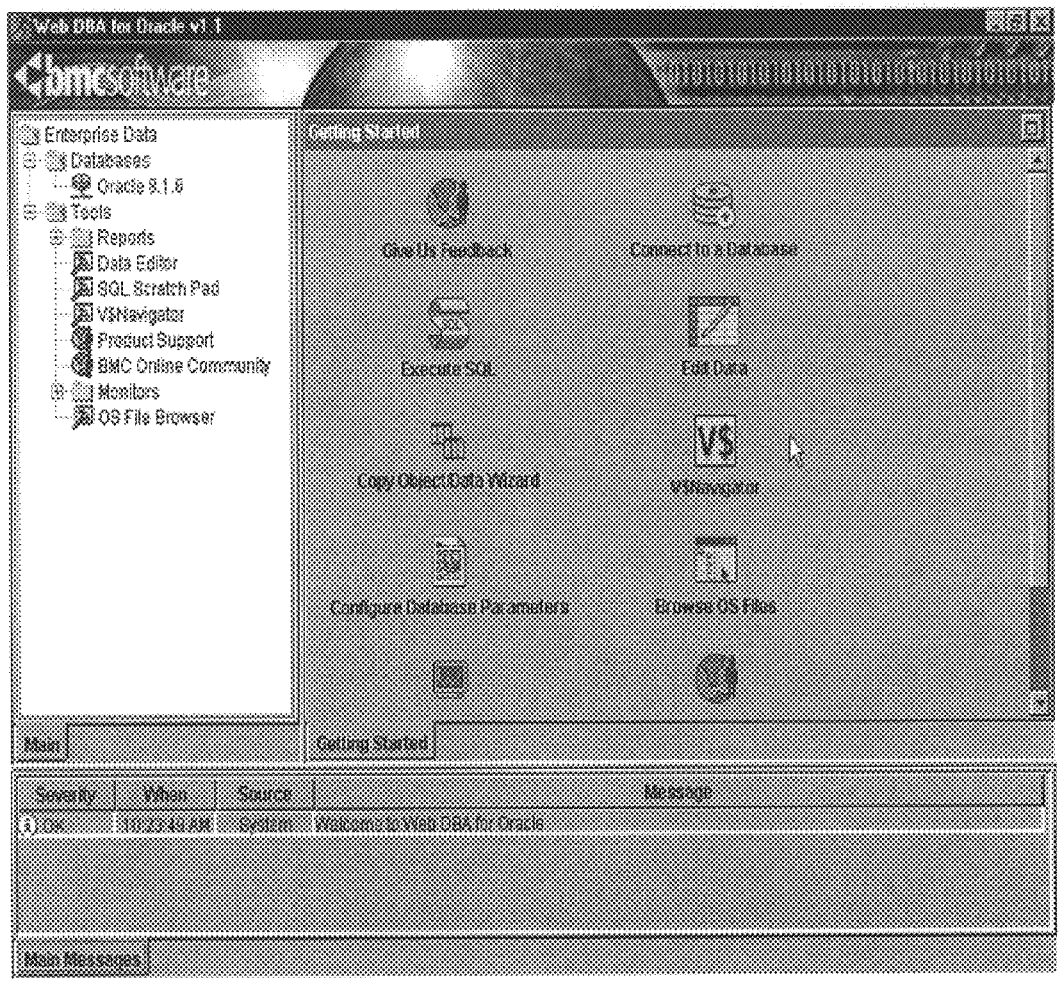
FIG. 13 is a screen shot including a particular database in a database list and the V$Navigator component of a database administration tool that is suitable for implementing various embodiments.

FIG. 13: Selection of the V$Navigator Component

FIG. 13 illustrates a screen shot of a database administration tool according to one embodiment. The "Oracle 8.1.6" database is included, and it is noted that the user can select it (e.g., by left-clicking on the mouse). After selecting a database, the user may open a V$Navigator window by double-clicking on "V$Navigator". Alternatively and not displayed in this screen shot, the user may right-click on a database for a menu listing various options.

Figure 14:
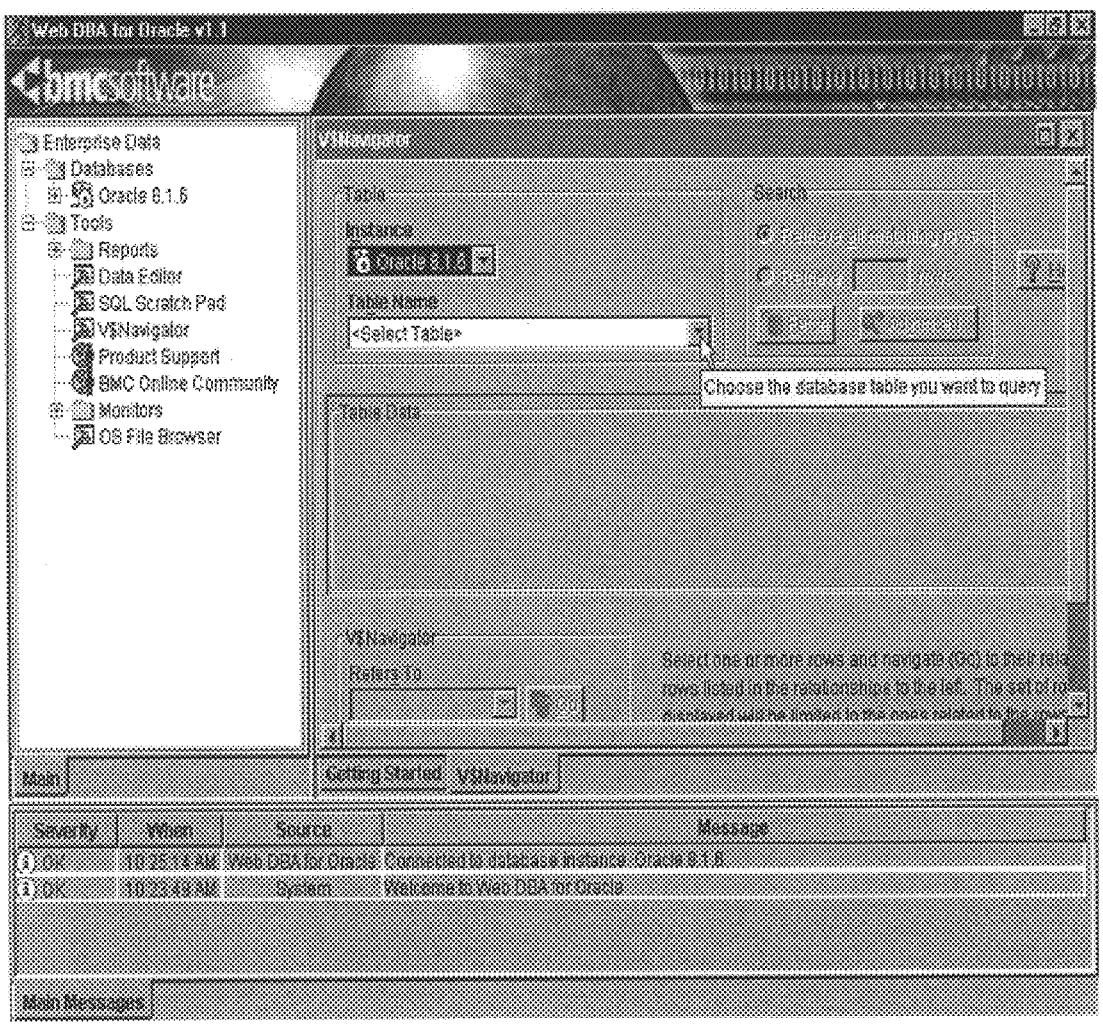
FIG. 14 is a screen shot illustrating the on-line help text associated with a Table Name drop-down list box according to one embodiment.

FIG. 14: On-line Help Text

FIG. 14 illustrates a screen shot of a V$Navigator window according to one embodiment. Due to the user selection of the "Oracle 8.1.6" database shown in FIG. 13, the "Instance" drop-down list in the "Table" section of the V$Navigator window has been pre-filled with the "Oracle 8.1.6" database. It is possible for the user to change the instance by choosing another instance from the drop-down list (see FIG. 4 for a listing of other instances available to the user). As shown in FIG. 14, on-line help text for the "down-arrow" push-button for the "Table Name" drop-down list is displayed on the screen shot. This on-line help text (i.e., "Choose the database table you want to query") indicates the purpose of choosing a database table or a V$ view. See FIG. 15 for a listing of the V$ views for the "Oracle 8.1.6" database available to the user.

Figure 15:
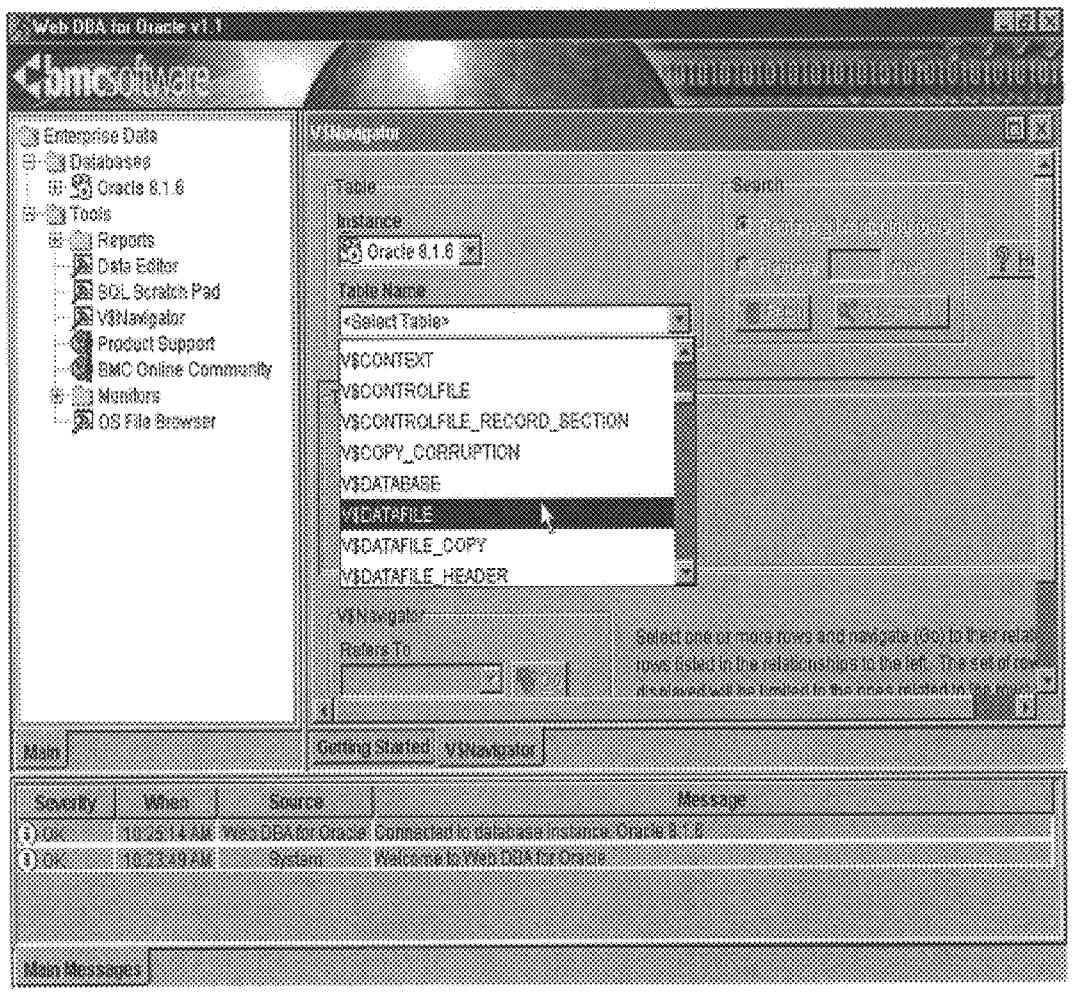
FIG. 15 is a screen shot illustrating the selection of a particular V$ view of a database selected in FIG. 13.

FIG. 15: Selection of a V$ View

FIG. 15 illustrates the selection of a particular V$ view of the "Oracle 8.1.6" database, according to one embodiment. As shown, the user has selected a particular V$ view (i.e., the V$DATAFILE view). As is common practice for graphical user interfaces, the selected row is highlighted.

Similar to FIG. 6, the Search group box includes two radio push-buttons with these captions: "Retrieve all matching rows" and "Retrieve_rows". It is noted that the grayed-out entry box for the "Retrieve_rows" radio push-button indicates that the user does not have access to this field in this window. In one embodiment, the "Retrieve all matching rows" radio push-button is selected as the default choice (i.e., if the user does not specify otherwise, the "Retrieve all matching rows" choice is chosen for the user). Since there are only two radio push-buttons, and one of them ("Retrieve_rows" radio push-button) is disabled in this window, effectively the "Retrieve all matching rows" radio push-button is the only choice available to the user in this window.

Figure 16:
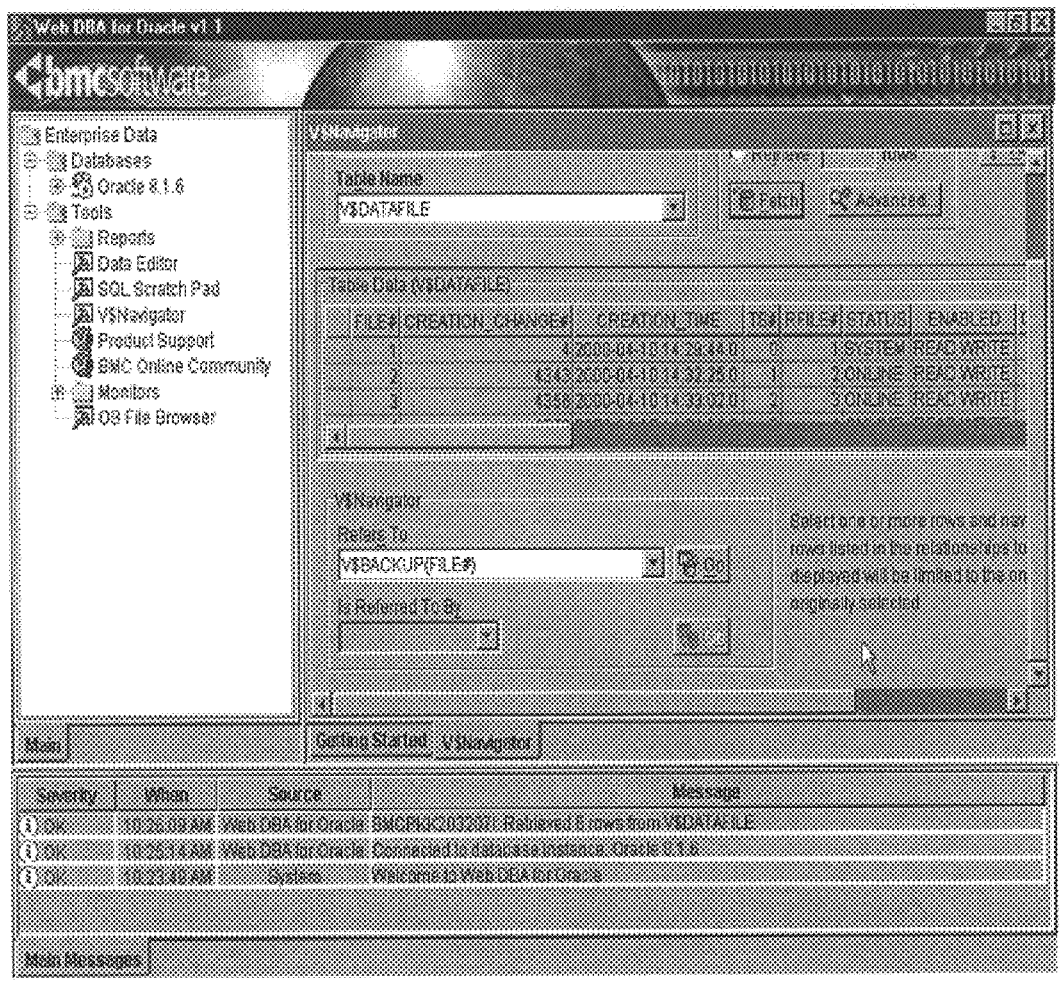
FIG. 16 is a screen shot illustrating the results of the user request submitted, as shown in FIG. 15.

FIG. 16: Results of the Selection of a V$ View

FIG. 16 illustrates the results of the user requested retrieval of all matching rows of the V$DATAFILE view, according to one embodiment. The user arrives at this window by simply selecting a particular V$ view in FIG. 15 (i.e., selecting the "Fetch" push-button is not necessary). The "Table Data (V$DATAFILE)" section of the screen shot is shown populated with data retrieved from the database. Comparing FIG. 16 with FIG. 8, it can be seen that the titles of the sections containing the "Refers To" drop-down list and the "Is Referred To By" drop-down list differ, whereas the drop-down lists have the same function in both windows. That is, in FIG. 8, the title of the section is "Referential Integrity Navigation Enabled", and is preceded by a checkbox; in FIG. 16, the title of the section is "V$Navigator" and there is no checkbox. The reason for this difference is that when the user double-clicks on "V$Navigator" (see FIG. 13), by default the referential integrity navigation is automatically enabled.

As shown in FIG. 16, the "Refers To" drop-down list, includes the V$BACKUP view, indicating that the V$DATAFILE view refers to the V$BACKUP view. However, there are no views listed in the "Is Referred To By" drop-down list, meaning that the V$DATAFILE view is referred to by no V$ views.

It is noted that the referential integrity of V$ views and GV$ views is not stored in the Oracle database. In one embodiment, in order to provide "referential declaration" for the purpose of traversing the Oracle V$ views and GV$ views in the same manner as regular Oracle database tables, the navigational relationships between the V$ views (and similarly, the GV$ views) are stored on a server computer system. These relationships may be manually created.

Figure 17:
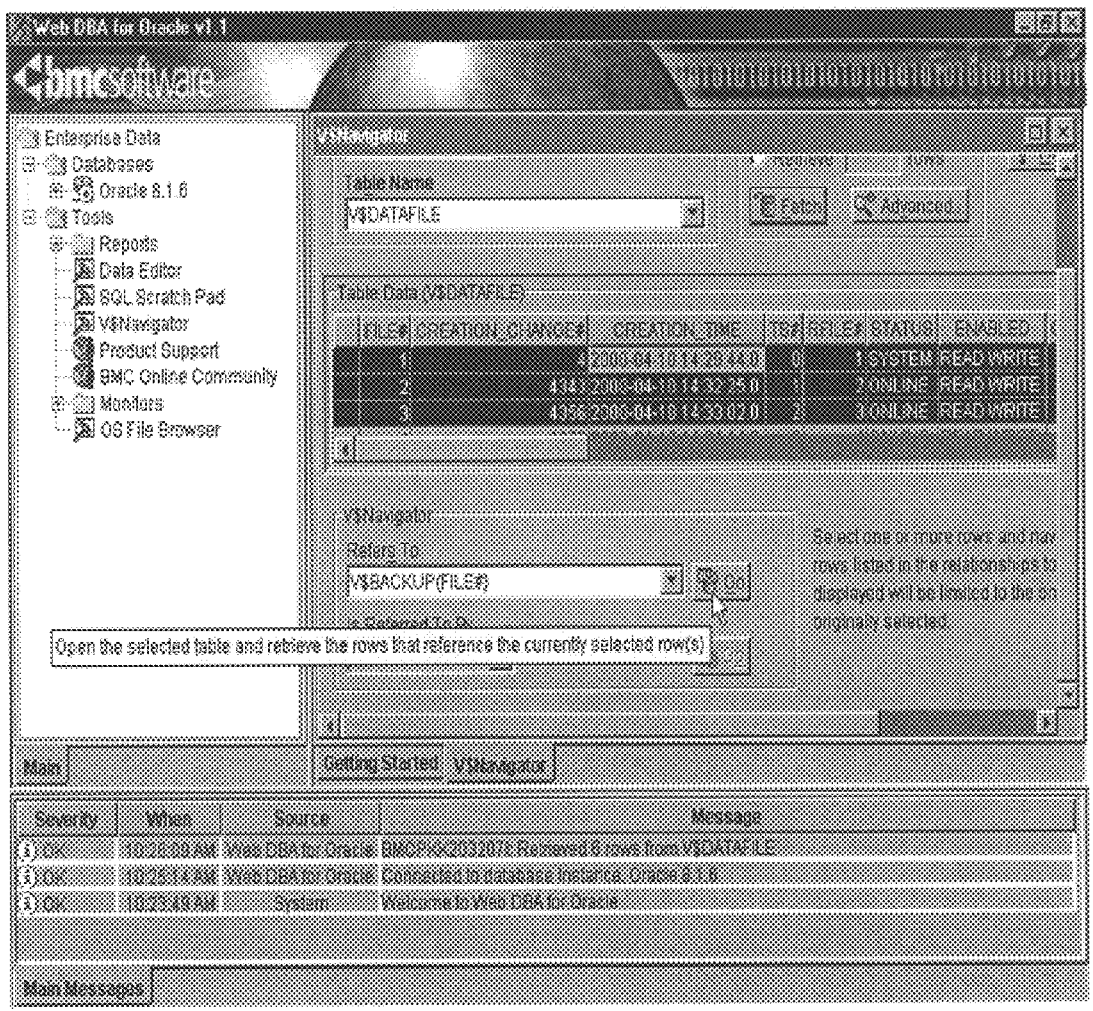
FIG. 17 is a screen shot illustrating the selection of three particular records of the particular V$ view selected in FIG. 15, along with the requested retrieval, by the user, of the rows in another V$ view which reference the selected records.

FIG. 17: Selection of Three Records and Requested Retrieval of Data from Another View FIG. 17 illustrates the selection of three records of the V$DATAHILE view, according to one embodiment. As shown, the user has selected three rows (i.e., the rows where the FILE# field has a value of "1", "2", or "3"). Additionally, it is shown that the user has placed the cursor over the "Go" push-button which may be found to the right of the "Refers To" drop-down list. On-line help text which explains the action that will be taken if the "Go" push-button is selected is displayed on the screen shot. It is noted that a similar "Go" push-button may be found to the right of the "Is Referred To By" drop-down list. This "Go" push-button has an action associated with it that is similar to the action associated with the "Go" push-button which may be found to the right of the "Refers To" drop-down list. Review of the on-line help text for the push-button, along with the positioning of each "Go" push-button indicates to the user the action that will be taken upon selection.

Figure 18:
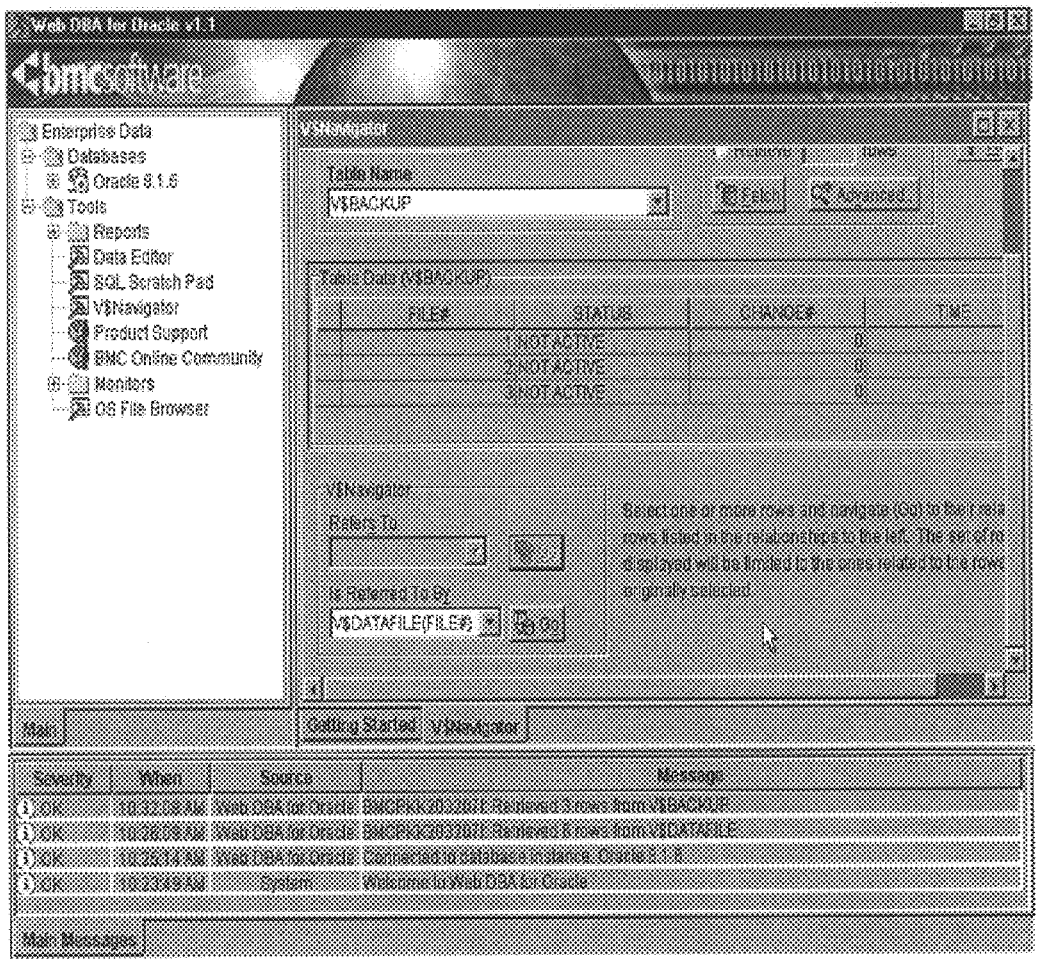
FIG. 18 is a screen shot illustrating the results of the user request submitted, as shown in FIG. 17.

FIG. 18: Results of the Retrieval of Data from Another View

FIG. 18 illustrates the results of the user clicking on the "Go" push-button which may be found to the right of the "Refers To" drop-down list in FIG. 17. The "Table Data (V$BACKUP)" section of the screen shot is shown populated with data retrieved from the database. Similar to FIG.

16, there is a section in the screen shot entitled "V$Navigator" and there is no checkbox. As in FIG. 16, there is no need for a checkbox next to the title of the section ("V$Navigator") as referential integrity navigation is automatically enabled for V$ views.

As shown in FIG. 18, there are no views listed in the "Refers To" drop-down list, meaning that the V$BACKUP view refers to no V$ views. However, the "Is Referred To By" drop-down list includes the V$DATAFILE view, indicating that the V$BACKUP view is referred to by the V$DATAFILE view.

Figure 19:
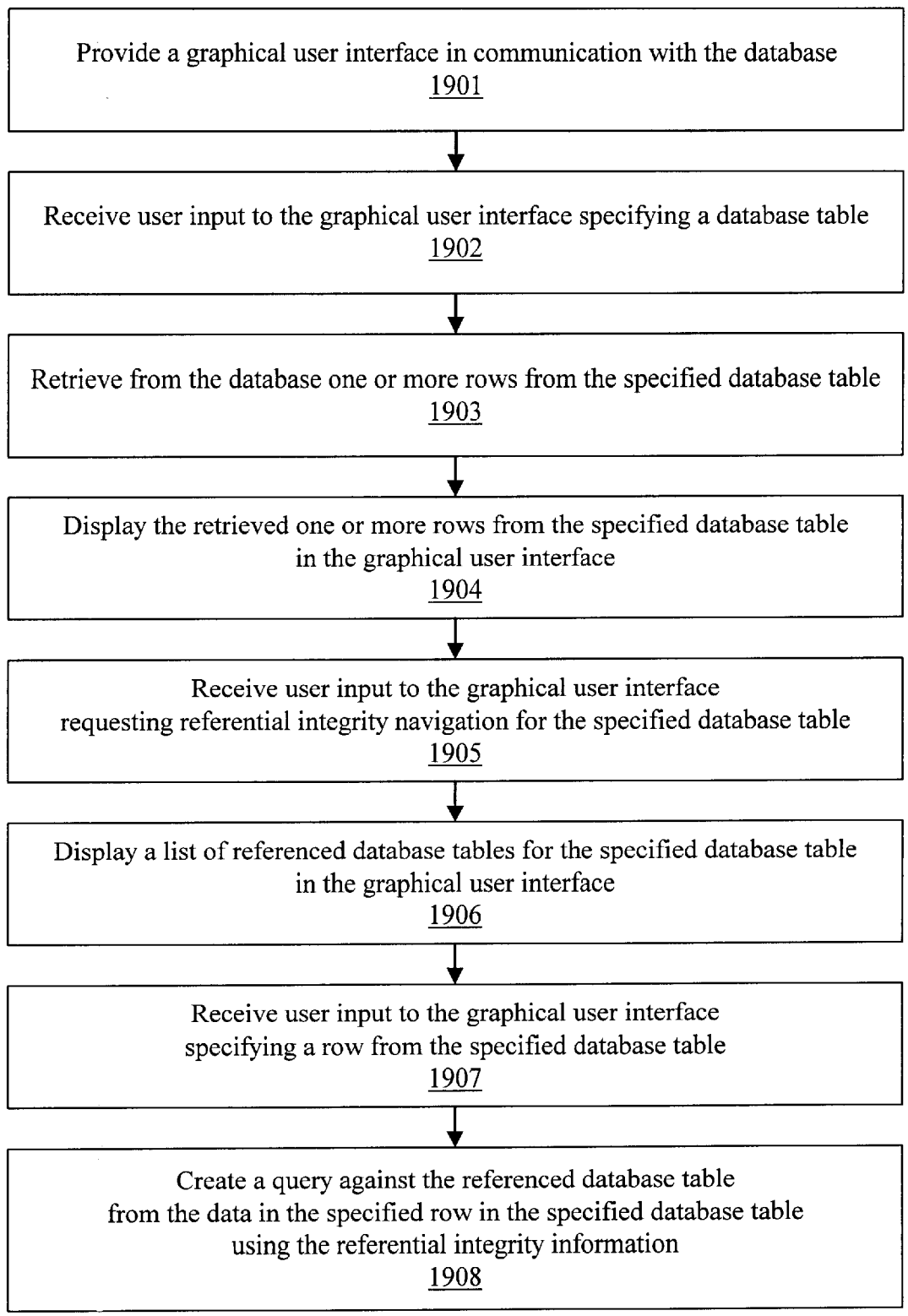
FIG. 19 is a flowchart illustrating a process to browse or edit a database table according to one embodiment.

FIG. 19: Database Table Process

FIG. 19 is a flowchart of an embodiment of a system and method for browsing or editing a database table. FIG. 19 illustrates a method for enabling a user to browse or edit a database table. It is noted that the method of FIG. 19 is exemplary only, and various methods may be used to enable users to browse or edit a database table according to the present invention. For example, various steps in FIG. 19 are optional and may be omitted, as desired. In one embodiment, the server system 116 and the user (or client) computer system 112 may communicate through the Internet and/or the World Wide Web.

In step 1901 a graphical user interface is presented to the user. The graphical user interface may be provided by a software program residing on the server system 116, wherein this graphical user interface is presented on the user computer system 112 or alternatively on another client computer system connected to the server computer system 116. A database is connected to the server computer system 116. The database may either reside on the server computer system 116 or on another computer system in communication with the server computer system 116. The contents of this database may be displayed to, and modified by the user, as shown in the following steps.

The ease of use of a graphical user interface, as opposed to a command line interface, from the user perspective enhances the ability of a user to relatively quickly browse or edit the data in the database.

In step 1902 the server computer system 116 may receive user input entered in the graphical user interface (e.g., the client computer system 112 may capture keystrokes, mouse clicks or other forms of input made by the user on the graphical user interface screen and transmit that input data to the server computer system 116). The user input may specify a database table to be edited.

In step 1903 the server computer system 116 may retrieve from the database one or more rows from the specified database table. Subsequent to the retrieval of the one or more rows from the database, the server computer system 116 may then transmit the rows to the client computer system 112 for display, as detailed in the next step.

In step 1904 the client computer system 112 may display to the user (in the graphical user interface) the one or more rows retrieved from the specified database table of the database.

In step 1905 the server computer system 116 may receive user input entered in the graphical user interface (e.g., the client computer system 112 may capture the keystrokes, mouse clicks or other forms of input made by the user on the graphical user interface screen and transmit that input data to the server computer system 116). In one embodiment, the user input requesting referential integrity navigation for the specified database table may be a checkmark in a conventional checkbox. For example, the caption associated with the conventional checkbox may read: "Referential Integrity Navigation Enabled".

In step 1906 the client computer system 112 may display to the user (in the graphical user interface) a list of referenced database tables for the specified database table. The list of referenced database tables may include a list of database tables that are referred to by the specified database table. The list of referenced database tables may also include a list of database tables that refer to the specified database table. Thus, the term "referenced" may include "referenced" or "referencing". In one embodiment, the list of referenced database tables may be retrieved from information stored in the database.

In step 1907 the server computer system 116 may receive user input entered in the graphical user interface (e.g., the client computer system 112 may capture the keystrokes, mouse clicks or other forms of input made by the user on the graphical user interface screen and transmit that input data to the server computer system 116). The user input may specify a row from the specified database table to be edited.

In step 1908 the referential integrity information may be used to create from the data in the row specified in step 1907 a query against the referenced database table. In the specific case of Oracle this requires the generation of a "where clause" in the SQL language. SQL (Structured Query Language) is a standardized language for specifying queries and data maintenance operations to a relational database. Subsequent to the retrieval of the one or more rows from the referenced database table from the database, the server computer system 116 may then transmit the rows to the client computer system 112 for display to the user. In other words, the user may navigate to one or more of the referenced database tables by making such a request (e.g., by clicking on the "Go" push-button) via the graphical user interface.

Figure 20:
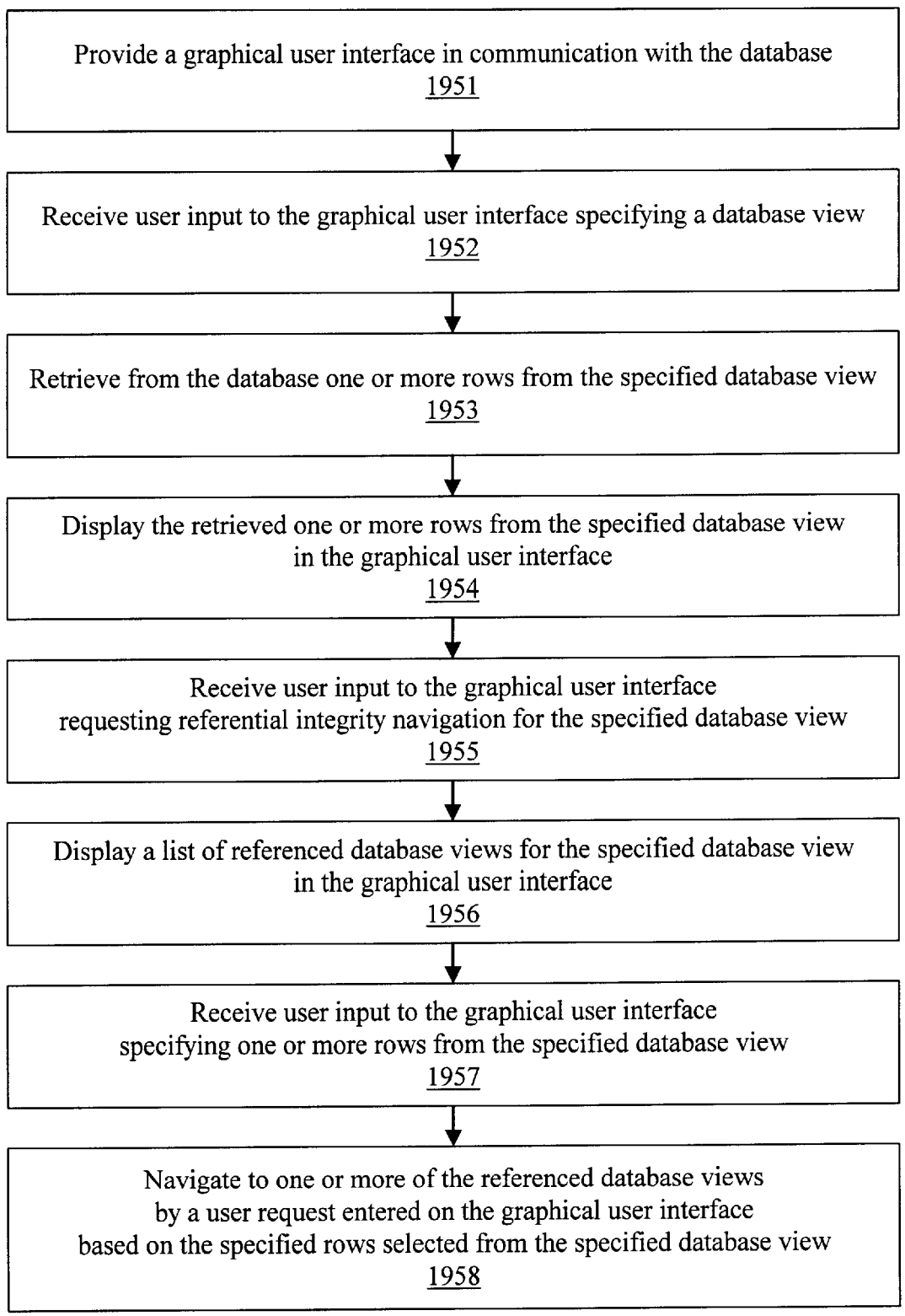
FIG. 20 is a flowchart illustrating a process to browse or edit a database view according to one embodiment.

FIG. 20: Database View Process

FIG. 20 is a flowchart of an embodiment of a system and method for browsing a database view. FIG. 20 illustrates a method for enabling a user to browse a database view. It is noted that the method of FIG. 20 is exemplary only, and various methods may be used to enable users to browse a database view according to the present invention. For example, various steps in FIG. 20 are optional and may be omitted, as desired.

In step 1951 a graphical user interface is presented to the user. The graphical user interface may be provided by a software program residing on the server system 116, wherein this graphical user interface is presented on the user computer system 112 or alternatively on another client computer system connected to the server computer system 116. A database is connected to the server computer system 116. The contents of this database may be displayed to, and modified by the user, as shown in the following steps. In one embodiment, the server system 116 and the user (or client) computer system 112 may communicate through the Internet and/or the World Wide Web.

The ease of use of a graphical user interface, as opposed to a command line interface, from the user perspective enhances the ability of a user to relatively quickly browse or edit the data in the database.

In step 1952 the server computer system 116 may receive user input entered in the graphical user interface (e.g., the client computer system 112 may capture the keystrokes, mouse clicks or other forms of input made by the user on the graphical user interface screen and transmit that input data to the server computer system 116). The user input may specify a database view to be edited.

In step 1953 the server computer system 116 may retrieve from the database one or more rows from the specified database view. Subsequent to the retrieval of the one or more rows from the database, the server computer system 116 may then transmit the rows to the client computer system 112 for display, as detailed in the next step.

In step 1954 the client computer system 112 may display to the user (in the graphical user interface) the one or more rows retrieved from the specified database view of the database.

In step 1955 the server computer system 116 may receive user input entered in the graphical user interface (e.g., the client computer system 112 may capture the keystrokes, mouse clicks or other forms of input made by the user on the graphical user interface screen and transmit that input data to the server computer system 116). In one embodiment, the user input requesting referential integrity navigation for the specified database view may be a checkmark in a conventional checkbox. For example, the caption associated with the conventional checkbox may read: "Referential Integrity Navigation Enabled". Alternatively, referential integrity navigation may be automatically enabled when the user selects a database view (see step 1952).

In step 1956 the client computer system 112 may display to the user (in the graphical user interface) a list of referenced database views for the specified database view. The list of referenced database views may include a list of database views that are referred to by the specified database view. The list of referenced database views may also include a list of database views that refer to the specified database view. In one embodiment, the list of referenced database views may be previously created in a file, wherein this file is created outside of the database. This file may be periodically updated, as needed.

In step 1957 the server computer system 116 may receive user input entered in the graphical user interface (e.g., the client computer system 112 may capture the keystrokes, mouse clicks or other forms of input made by the user on the graphical user interface screen and transmit that input data to the server computer system 116). The user input may specify one or more rows from the specified database view to be displayed. V$ and GV$ views cannot be updated.

In step 1958 the one or more rows specified in step 1907 are used as a constraint (e.g., a "where" clause in SQL) by the server computer system 116 to retrieve from the database one or more rows from the referenced database view. Subsequent to the retrieval of the one or more rows from the referenced database view from the database, the server computer system 116 may then transmit the rows to the client computer system 112 for display to the user. In other words, the user may navigate to one or more of the referenced database views by making such a request (e.g., by clicking on the "Go" push-button) via the graphical user interface.

Although the system and method of the present invention have been described in connection with several embodiments, the invention is not intended to be limited to the specific forms set forth herein, but on the contrary, it is intended to cover such alternatives, modifications, and equivalents as may be reasonably included within the spirit and scope of the invention as defined by the appended claims:

What is claimed is:

1. A method of enabling browsing and editing of database tables on a computer system, the method comprising:

providing a graphical user interface in communication with the database;

displaying one or more rows from a specified database table in the graphical user interface;

receiving user input to the graphical user interface requesting referential integrity navigation for the specified database table;

displaying a list of referenced database tables for the specified database table in the graphical user interface;

receiving user input to the graphical user interface specifying one or more rows from the specified database table; and navigating to one or more of the referenced database tables by a user request entered on the graphical user interface based on the specified rows selected from the specified database table.

2. The method of claim 1 wherein the database is a relational database.

3. The method of claim 1 wherein displaying a list of referenced database tables for the specified database table in the graphical user interface further comprises:

displaying a list of database tables which are referred to by the specified database table; and displaying a list of database tables which refer to the specified database table.

4. The method of claim 1 wherein navigating to one or more of the referenced database tables by a user request entered on the graphical user interface further comprises:

retrieving from the database one or more rows from a referenced database table where the retrieved rows reference the currently specified one or more rows from the specified database table; and displaying the retrieved one or more rows from the referenced database table in the graphical user interface.

5. The method of claim 1 wherein navigating to one or more of the referenced database tables by a user request entered on the graphical user interface further comprises:

retrieving from the database one or more rows from a referenced database table where the retrieved rows are referenced by the currently specified one or more rows from the specified database table; and displaying the retrieved one or more rows from the referenced database table in the graphical user interface.

6. The method of claim 1, wherein, prior to said displaying the one or more rows from the specified database table, the method further comprises:

receiving user input to the graphical user interface specifying a database table; and retrieving from the database the one or more rows from the specified database table.

7. The method of claim 1, wherein said providing the graphical user interface in communication with the database comprises a server computer system providing the graphical user interface for display on a client computer system over a network.

8. A method of enabling browsing and editing of database tables on a computer system, the method comprising:

providing a graphical user interface in communication with the database;

displaying one or more rows from a specified database table in the graphical user interface;

receiving user input to the graphical user interface requesting referential integrity navigation for the specified database table;

displaying a list of referenced database tables for the specified database table in the graphical user interface.

9. The method of claim 8, further comprising:

receiving user input to the graphical user interface specifying one or more rows from the specified database table; and navigating to one or more of the referenced database tables by a user request entered on the graphical user interface based on the specified rows selected from the specified database table.

10. A method of enabling browsing and editing of database tables on a computer system, the method comprising:

providing a graphical user interface in communication with the database;

receiving user input to the graphical user interface specifying a database table;

retrieving from the database one or more rows from the specified database table;

displaying the retrieved one or more rows from the specified database table in the graphical user interface;

receiving user input to the graphical user interface requesting referential integrity navigation for the specified database table;

displaying a list of referenced database tables for the specified database table in the graphical user interface;

receiving user input to the graphical user interface specifying one or more rows from the specified database table; and navigating to one or more of the referenced database tables by a user request entered on the graphical user interface based on the specified rows selected from the specified database table.

11. A method of browsing of database views on a computer system, the method comprising:

providing a graphical user interface in communication with the database;

displaying one or more rows from a specified database view in the graphical user interface;

receiving user input to the graphical user interface requesting referential integrity navigation for the specified database view;

displaying a list of referenced database views for the specified database view in the graphical user interface;

receiving user input to the graphical user interface specifying one or more rows from the specified database view; and navigating to one or more of the referenced database views by a user request entered on the graphical user interface based on the specified rows selected from the specified database view.

12. The method of claim 11 wherein the database is a relational database.

13. The method of claim 11 wherein the database views are V$ views in an Oracle database.

14. The method of claim 11 wherein the database views are GV$ views in an Oracle database.

15. The method of claim 11 wherein displaying a list of referenced database views for the specified database view in the graphical user interface further comprises:

displaying a list of database views which are referred to by the specified database view; and displaying a list of database views which refer to the specified database view.

16. The method of claim 11 wherein navigating to one or more of the referenced database views by a user request entered on the graphical user interface further comprises:

retrieving from the database one or more rows from a referenced database view where the retrieved rows reference the currently specified one or more rows from the specified database view; and displaying the retrieved one or more rows from the referenced database view in the graphical user interface.

17. The method of claim 11 wherein navigating to one or more of the referenced database views by a user request entered on the graphical user interface further comprises:

retrieving from the database one or more rows from a referenced database view where the retrieved rows are referenced by the currently specified one or more rows from the specified database view; and displaying the retrieved one or more rows from the referenced database view in the graphical user interface.

18. The method of claim 11, wherein, prior to said displaying the one or more rows from the specified database view, the method further comprises:

receiving user input to the graphical user interface specifying a database view; and retrieving from the database the one or more rows from the specified database view.

19. The method of claim 11, wherein said providing the graphical user interface in communication with the database comprises a server computer system providing the graphical user interface for display on a client computer system over a network.

20. A method of browsing of database views on a computer system, the method comprising:

providing a graphical user interface in communication with the database;

displaying one or more rows from a specified database view in the graphical user interface;

receiving user input to the graphical user interface requesting referential integrity navigation for the specified database view;

displaying a list of referenced database views for the specified database view in the graphical user interface.

21. The method of claim 20, further comprising:

receiving user input to the graphical user interface specifying one or more rows from the specified database view; and navigating to one or more of the referenced database views by a user request entered on the graphical user interface based on the specified rows selected from the specified database view.

22. A method of browsing of database views on a computer system, the method comprising:

providing a graphical user interface in communication with the database;

receiving user input to the graphical user interface specifying a database view;

retrieving from the database one or more rows from the specified database view;

displaying the retrieved one or more rows from the specified database view in the graphical user interface;

receiving user input to the graphical user interface requesting referential integrity navigation for the specified database view;

displaying a list of referenced database views for the specified database view in the graphical user interface;

receiving user input to the graphical user interface specifying one or more rows from the specified database view; and navigating to one or more of the referenced database views by a user request entered on the graphical user interface based on the specified rows selected from the specified database view.

23. A system of enabling browsing and editing of database tables, the system comprising:

a network;

a CPU coupled to the network;

a system memory coupled to the CPU, wherein the system memory stores one or more computer programs executable by the CPU;

wherein the computer programs are executable to:

provide a graphical user interface in communication with the database;

display one or more rows from a specified database table in the graphical user interface;

receive user input to the graphical user interface requesting referential integrity navigation for the specified database table;

display a list of referenced database tables for the specified database table in the graphical user interface;

receive user input to the graphical user interface specifying one or more rows from the specified database table; and navigate to one or more of the referenced database tables by a user request entered on the graphical user interface based on the specified rows selected from the specified database table.

24. The system of claim 23 wherein the database is a relational database.

25. The system of claim 23 wherein in displaying a list of referenced database tables for the specified database table in the graphical user interface the computer programs are further executable to:

display a list of database tables which are referred to by the specified database table; and display a list of database tables which refer to the specified database table.

26. The system of claim 23 wherein in navigating to one or more of the referenced database tables by a user request entered on the graphical user interface the computer programs are further executable to:

retrieve from the database one or more rows from a referenced database table where the retrieved rows reference the currently specified one or more rows from the specified database table; and display the retrieved one or more rows from the referenced database table in the graphical user interface.

27. The system of claim 23 wherein in navigating to one or more of the referenced database tables by a user request entered on the graphical user interface the computer programs are further executable to:

retrieve from the database one or more rows from a referenced database table where the retrieved rows are referenced by the currently specified one or more rows from the specified database table; and display the retrieved one or more rows from the referenced database table in the graphical user interface.

28. The system of claim 23, wherein, prior to said display of the one or more rows from the specified database table, the computer programs are further executable to:

receive user input to the graphical user interface specifying a database table; and retrieve from the database the one or more rows from the specified database table.

29. The system of claim 23, wherein in providing the graphical user interface in communication with the database the system further comprises a server computer system providing the graphical user interface for display on a client computer system over a network.

30. A system of enabling browsing and editing of database tables, the system comprising:

a network;

a CPU coupled to the network;

a system memory coupled to the CPU, wherein the system memory stores one or more computer programs executable by the CPU;

wherein the computer programs are executable to:

provide a graphical user interface in communication with the database;

display one or more rows from a specified database table in the graphical user interface;

receive user input to the graphical user interface requesting referential integrity navigation for the specified database table;

display a list of referenced database tables for the specified database table in the graphical user interface.

31. A carrier medium which stores program instructions for enabling browsing and editing of database tables on a computer system, wherein the program instructions are executable to implement:

providing a graphical user interface in communication with the database;

displaying one or more rows from a specified database table in the graphical user interface;

receiving user input to the graphical user interface requesting referential integrity navigation for the specified database table;

displaying a list of referenced database tables for the specified database table in the graphical user interface;

receiving user input to the graphical user interface specifying one or more rows from the specified database table; and navigating to one or more of the referenced database tables by a user request entered on the graphical user interface based on the specified rows selected from the specified database table.

32. The carrier medium of claim 31 wherein the database is a relational database.

33. The carrier medium of claim 31 wherein in displaying a list of referenced database tables for the specified database table in the graphical user interface the program instructions are further executable to implement:

displaying a list of database tables which are referred to by the specified database table; and displaying a list of database tables which refer to the specified database table.

34. The carrier medium of claim 31 wherein in navigating to one or more of the referenced database tables by a user request entered on the graphical user interface the program instructions are further executable to implement:

retrieving from the database one or more rows from a referenced database table where the retrieved rows reference the currently specified one or more rows from the specified database table; and displaying the retrieved one or more rows from the referenced database table in the graphical user interface.

35. The carrier medium of claim 31 wherein in navigating to one or more of the referenced database tables by a user request entered on the graphical user interface the program instructions are further executable to implement:

retrieving from the database one or more rows from a referenced database table where the retrieved rows are referenced by the currently specified one or more rows from the specified database table; and displaying the retrieved one or more rows from the referenced database table in the graphical user interface.

36. The carrier medium of claim 31, wherein, prior to said display of the one or more rows from the specified database table, the program instructions are further executable to implement:

receiving user input to the graphical user interface specifying a database table; and retrieving from the database the one or more rows from the specified database table.

37. The carrier medium of claim 31, further comprising a server computer system providing the graphical user interface for display on a client computer system over a network.

38. A carrier medium which stores program instructions for enabling browsing and editing of database tables on a computer system, wherein the program instructions are executable to implement:

providing a graphical user interface in communication with the database;

displaying one or more rows from a specified database table in the graphical user interface;

receiving user input to the graphical user interface requesting referential integrity navigation for the specified database table;

displaying a list of referenced database tables for the specified database table in the graphical user interface.

39. The carrier medium of claim 31, wherein the carrier medium is a memory medium.

* * * * *